United States Patent
Konakai et al.

(10) Patent No.: US 9,388,877 B2
(45) Date of Patent: Jul. 12, 2016

(54) PRESSURE SHOCK ABSORBING APPARATUS

(71) Applicant: SHOWA CORPORATION, Gyoda-shi (JP)

(72) Inventors: Seiryo Konakai, Gyoda (JP); Kunio Shibasaki, Gyoda (JP); Takahiro Miura, Gyoda (JP); Tetsuya Shirotsuka, Gyoda (JP)

(73) Assignee: SHOWA CORPORATION, Gyoda-Shi (JP)

( * ) Notice: Subject to any disclaimer, the term of this patent is extended or adjusted under 35 U.S.C. 154(b) by 127 days.

(21) Appl. No.: 14/012,358

(22) Filed: Aug. 28, 2013

(65) Prior Publication Data

US 2014/0291089 A1    Oct. 2, 2014

(30) Foreign Application Priority Data

Mar. 29, 2013  (JP) .................... 2013-074951

(51) Int. Cl.
| | |
|---|---|
| *F16F 9/06* | (2006.01) |
| *F16F 9/34* | (2006.01) |
| *F16F 9/32* | (2006.01) |
| *F16F 9/46* | (2006.01) |

(52) U.S. Cl.
CPC . *F16F 9/34* (2013.01); *F16F 9/325* (2013.01); *F16F 9/464* (2013.01); *F16F 9/062* (2013.01)

(58) Field of Classification Search
CPC ........... F16F 9/062; F16F 9/185; F16F 9/187; F16F 9/325; F16F 9/3257; F16F 9/22; F16F 9/34; F16F 9/16; F16F 9/464
See application file for complete search history.

(56) References Cited

U.S. PATENT DOCUMENTS

| | | | | |
|---|---|---|---|---|
| 5,901,820 | A | * | 5/1999 | Kashiwagi et al. ........ 188/266.6 |
| 6,119,829 | A | * | 9/2000 | Nakadate ................... 188/266.6 |
| 6,155,391 | A | * | 12/2000 | Kashiwagi et al. ........ 188/266.6 |
| 2007/0000743 | A1 | * | 1/2007 | Naitou et al. .............. 188/322.2 |
| 2011/0073424 | A1 | * | 3/2011 | Murakami ............... 188/322.13 |
| 2012/0073920 | A1 | | 3/2012 | Yamasaki et al. |
| 2013/0313057 | A1 | * | 11/2013 | Tsukahara et al. ............ 188/313 |

FOREIGN PATENT DOCUMENTS

JP    2012-72857 A    4/2012

* cited by examiner

*Primary Examiner* — Anna Momper
(74) *Attorney, Agent, or Firm* — Leason Ellis LLP

(57) ABSTRACT

A pressure shock absorbing apparatus includes: a first cylinder; a second cylinder that is placed outside the first cylinder to form a liquid storage unit; a partitioning member that is disposed in such a manner as to be movable in an axial direction inside the first cylinder to partition a space inside the first cylinder; a throttle mechanism that is disposed in a side portion of the second cylinder, and includes a throttle unit that throttles a flow path cross section of a liquid to discharge the liquid taken in from the first cylinder toward the liquid storage unit while passing the liquid through the throttle unit; and a suppression unit that is held by the throttle mechanism at a liquid discharge point between the throttle mechanism and the liquid storage unit to suppress air bubbles in the liquid in the liquid storage unit.

9 Claims, 11 Drawing Sheets

PRESSURE SHOCK ABSORBING APPARATUS

CROSS-REFERENCE TO RELATED APPLICATIONS

This application is based on and claims priority under 35 U.S.C. 119 from Japanese Patent Application No. 2013-074951 filed on Mar. 29, 2013; the entire content of which is incorporated herein by reference.

BACKGROUND OF INVENTION

1. Technical Field

The present invention relates to a pressure shock absorbing apparatus.

2. Related Art

The suspensions of vehicles such as automobiles have a pressure shock absorbing apparatus using a damping force generator so as to improve riding comfort and driving stability by properly mitigating vibration transmitted from a road surface to a vehicle body during driving. The pressure shock absorbing apparatus is provided, for example, with a partitioning member that is installed in a cylinder in a movable manner so as to partition the cylinder, a rod member that is connected to the partitioning member, and a liquid storage chamber that compensates for oil corresponding to the volume of the rod member as the rod member moves. In order to generate the damping force, resistance is provided to the flow of a liquid generated by the movement of the partitioning member.

Also, a pressure shock absorbing apparatus provided with a throttle mechanism is known, in which the throttle mechanism is installed, for example, in a side portion of a cylinder to take in the liquid in the cylinder and discharge the liquid into a liquid storage chamber by throttling the flow path and providing resistance. The main throttle mechanism generates a damping force by, for example, controlling the flow of oil generated by the sliding of a piston in the cylinder by means of a pilot-type main valve and a pilot valve that is a pressure control valve (for example, refer to JP-A-2012-72857).

SUMMARY OF INVENTION

When a liquid is discharged into a liquid storage chamber while throttling the flow, rippling occurs on a liquid surface (in the liquid storage chamber) and air is mixed with the liquid, and thus there is a concern that air bubbles could be generated (in the liquid). When a damping force is generated by, for example, a valve or the like in the cylinder by supplying the liquid containing the air bubbles into the cylinder, the damping force is less likely to be generated until the air bubbles disappear. Therefore, there is a high possibility that a delay in the generation of the damping force could be caused.

An object of the present invention is to prevent generation of air bubbles in a liquid in a pressure shock absorbing apparatus that includes a throttle mechanism which takes in a liquid from a cylinder and discharges the liquid to a liquid storage chamber while throttling the flow of the liquid.

An aspect of the present invention is directed to a pressure shock absorbing apparatus including: a first cylinder that accommodates a liquid; a second cylinder that is placed outside the first cylinder to form a liquid storage unit with the first cylinder in which the liquid accumulates between the first cylinder and the second cylinder; a partitioning member that is disposed in such a manner as to be movable in an axial direction inside the first cylinder to partition a space inside the first cylinder into a first liquid chamber and a second liquid chamber that accommodate the liquid; a throttle mechanism that is disposed in a side portion of the second cylinder, and includes a throttle unit that throttles a flow path cross section of the liquid to discharge the liquid taken in from the first cylinder toward the liquid storage unit while passing the liquid through the throttle unit; and a suppression unit that is held by the throttle mechanism at a liquid discharge point between the throttle mechanism and the liquid storage unit to suppress air bubbles in the liquid in the liquid storage unit.

The pressure shock absorbing apparatus may have a configuration in which the suppression unit includes a restriction unit that restricts the flow of the liquid discharged from the throttle mechanism.

The pressure shock absorbing apparatus may have a configuration in which the restriction unit is an annular member that is disposed in such a manner as to surround a periphery of the discharge point in the liquid storage unit, and has an outflow portion which causes the liquid to flow out from a part of the restriction unit in a circumferential direction of the annular member.

Another aspect of the invention is directed to a pressure shock absorbing apparatus including: a first cylinder that accommodates a liquid; a second cylinder that is placed outside the first cylinder to form a liquid storage unit with the first cylinder in which the liquid accumulates between the first cylinder and the second cylinder; a partitioning member that is disposed in such a manner as to be movable in an axial direction inside the first cylinder to partition a space inside the first cylinder into a first liquid chamber and a second liquid chamber that accommodate the liquid; a throttle mechanism that is disposed in a side portion of the second cylinder, and includes a throttle unit that throttles a flow path cross section of the liquid to discharge the liquid taken in from the first cylinder toward the liquid storage unit while passing the liquid through the throttle unit; and an inter-cylinder regulation unit that is placed between the first cylinder and the second cylinder, and is held by the throttle mechanism at a liquid discharge point between the throttle mechanism and the liquid storage unit to regulate the flow of the discharged liquid into one direction between the first cylinder and the second cylinder.

The pressure shock absorbing apparatus may have a configuration in which the inter-cylinder regulation unit includes an insertion member that is an annular member which is disposed in an outer circumferential portion of the first cylinder, and the insertion member is formed with a notch portion that extends from one end portion side in an axial direction of the second cylinder toward the other end portion side.

The pressure shock absorbing apparatus may have a configuration in which a concave portion is formed at a position continuing from a tip end of the other end portion side in the notch portion and is disposed on at least one of an outer circumferential surface and an inner circumferential surface of the insertion member.

The pressure shock absorbing apparatus may have a configuration in which the insertion member has a groove portion that decouples the insertion member in a circumferential direction of the second cylinder.

The pressure shock absorbing apparatus may have a configuration in which the insertion member has a protruding portion protruding from an inner circumferential portion toward the first cylinder side.

The pressure shock absorbing apparatus may have a configuration in which the insertion member has a circumferential direction surface which is disposed in an end portion on an opposite side to the notch portion in the axial direction and faces the circumferential direction.

Another aspect of the present invention is directed to a pressure shock absorbing apparatus including: a first cylinder that accommodates a liquid; a second cylinder that is placed outside the first cylinder to form a liquid storage unit with the first cylinder in which the liquid accumulates between the first cylinder and the second cylinder; a partitioning member that is disposed in such a manner as to be movable inside the first cylinder to partition a space inside the first cylinder into a first liquid chamber and a second liquid chamber that accommodate the liquid; a throttle mechanism that is disposed in a side portion of the second cylinder, and includes a throttle unit that throttles a flow path cross section of the liquid to discharge the liquid taken in from the first cylinder toward the liquid storage unit while passing the liquid through the throttle unit; and an allowance restriction unit that is held by the throttle mechanism at a liquid discharge point between the throttle mechanism and the liquid storage unit to allow the flow of a fluid from the throttle unit toward the liquid storage unit and restrict the flow of the fluid from the liquid storage unit toward the throttle unit.

The pressure shock absorbing apparatus may have a configuration in which the allowance restriction unit is disposed between the throttle unit and the liquid storage unit, and allows the flow by being elastically deformed by the flow of the fluid from the throttle unit toward the liquid storage unit and restricts the flow by resisting the flow of the fluid from the liquid storage unit toward the throttle unit.

According to any one of the configurations discussed above, it is possible to prevent generation of air bubbles in the liquid in the pressure shock absorbing apparatus that includes the throttle mechanism which takes in the liquid from the cylinder and discharges the liquid to the liquid storage chamber while throttling the flow.

DESCRIPTION OF EMBODIMENTS

Hereinafter, an embodiment of the present invention will be described in detail referring to the accompanying drawings.

Figure 1:
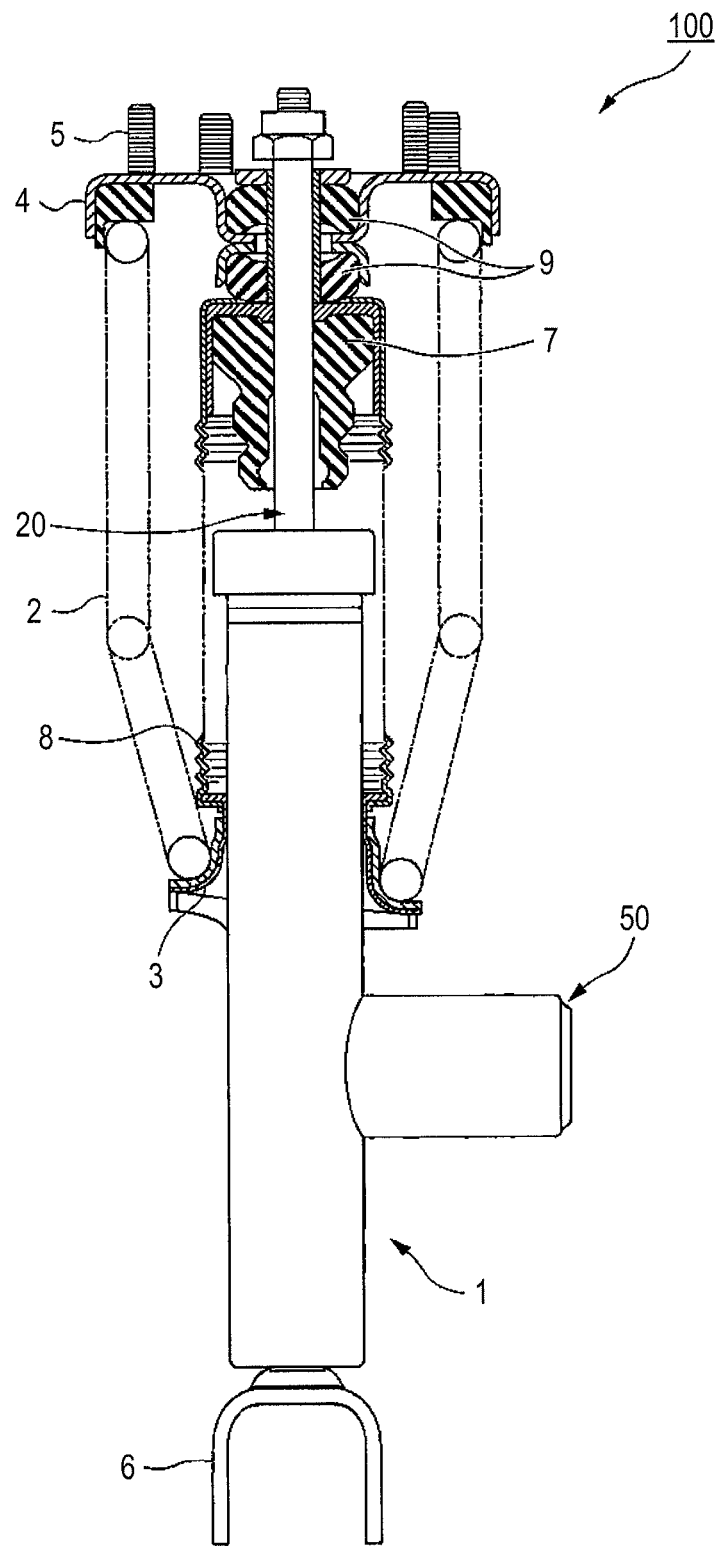
FIG. 1 is a schematic configuration diagram showing a suspension according to an embodiment.

FIG. 1 is a schematic configuration diagram showing a suspension 100 according to the embodiment.
Configuration and Function of Suspension 100

As shown in FIG. 1, the suspension 100 includes a hydraulic shock absorbing apparatus 1, and a coil spring 2 that is arranged outside the hydraulic shock absorbing apparatus 1. The coil spring 2 is held by a spring seat 3 and a spring seat 4 that are disposed at both ends. The suspension 100 includes a bolt 5 that is used to mount other parts on a vehicle body or the like, and a vehicle wheel side mounting portion 6 that is disposed in a lower portion of the hydraulic shock absorbing apparatus 1.

Also, the suspension 100 includes a bumper rubber 7 that is press-fit onto an outer circumference of a piston rod 20, described later, projecting from the hydraulic shock absorbing apparatus 1. Also, the suspension 100 includes a bellows-shaped dust cover 8 that covers an end portion of a part of the hydraulic shock absorbing apparatus 1 and the outer circumference of the piston rod 20 which protrudes from the hydraulic shock absorbing apparatus 1. Furthermore, the suspension 100 includes a plurality of (two in the embodiment) mount rubbers 9 that are arranged in a vertical direction on an upper end portion side of the piston rod 20 to absorb vibration.

Figure 2:
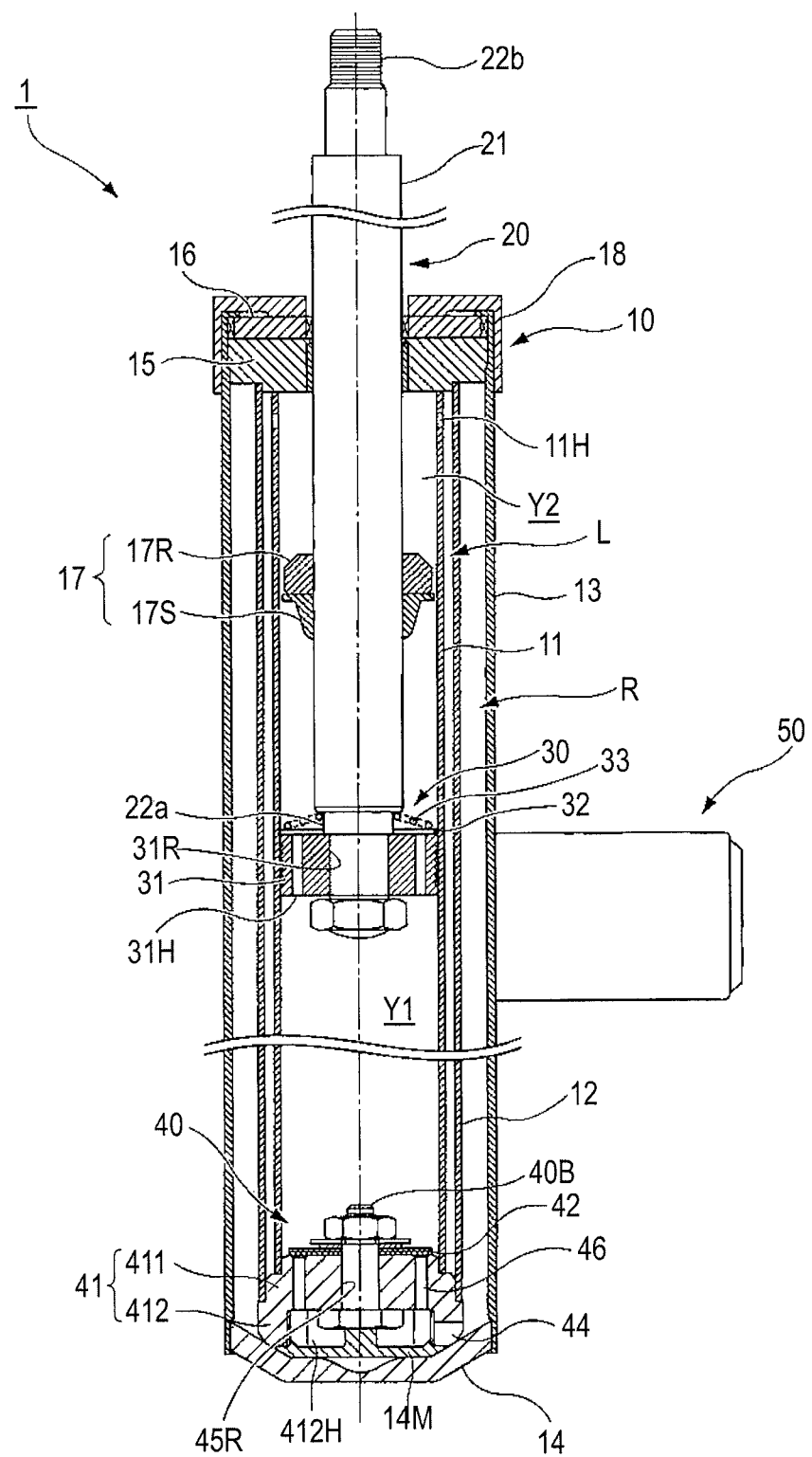
FIG. 2 is an overall configuration diagram showing a hydraulic shock absorbing apparatus according to the embodiment.

FIG. 2 is an overall configuration diagram showing the hydraulic shock absorbing apparatus 1 according to the embodiment.

Figure 3:
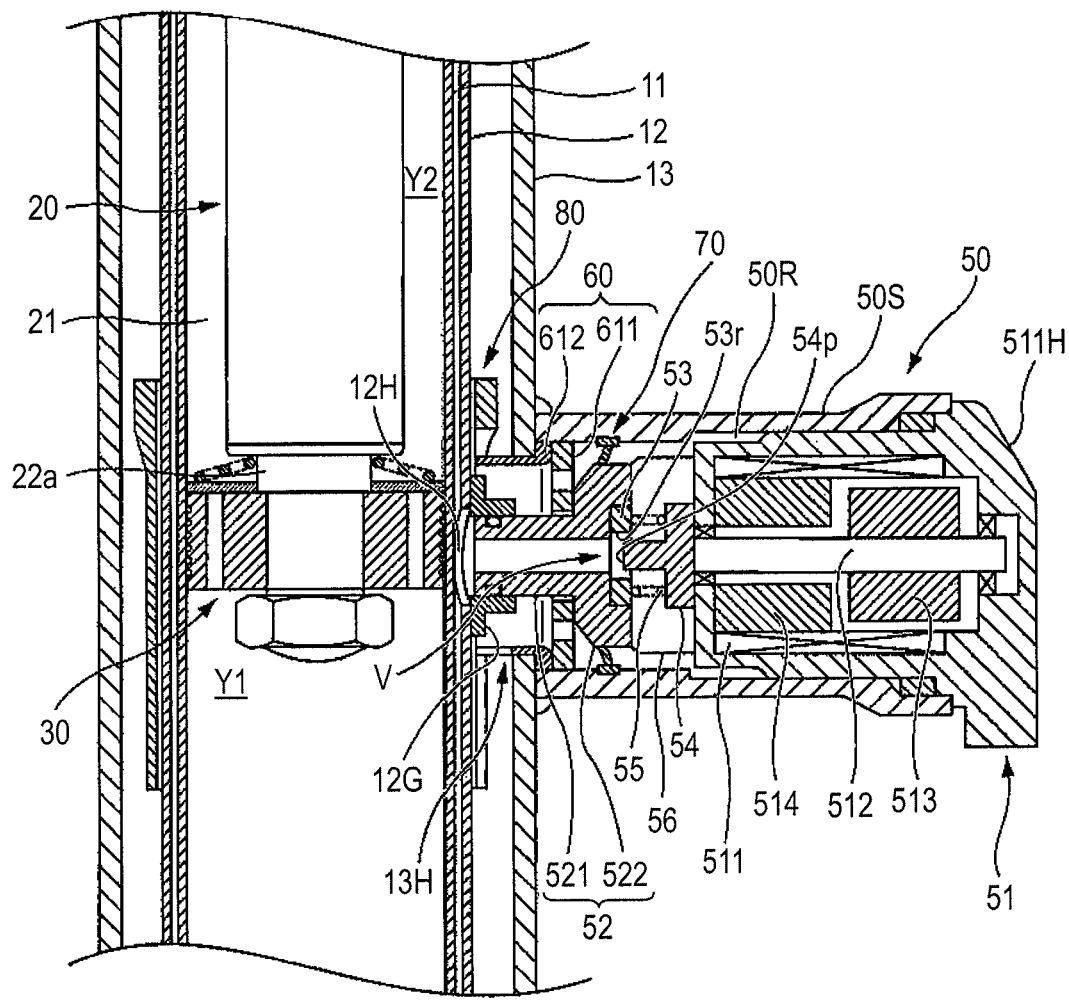
FIG. 3 is a detailed explanatory diagram showing the vicinity of a solenoid valve according to the embodiment.

FIG. 3 is a detailed explanatory diagram showing the vicinity of a solenoid valve according to the embodiment.
Configuration and Function of Hydraulic Shock Absorbing Apparatus 1

The hydraulic shock absorbing apparatus 1 includes a cylinder portion 10, the piston rod 20, a piston 30 as an example of a partitioning member, and a bottom valve 40 as shown in FIG. 2, and includes a solenoid valve 50 as an example of a throttle mechanism, a flow path restriction unit 60, a check valve mechanism 70, and a baffle member 80 as shown in FIG. 3. In the embodiment, each of the flow path restriction unit 60, the check valve mechanism 70, and the baffle member 80 functions as an example of a suppression unit.
Configuration and Function of Cylinder Portion 10

As shown in FIG. 2, the cylinder portion 10 includes a cylinder 11 as an example of a first cylinder, an outer tubular body 12 that is disposed outside the cylinder 11, and a damper case 13 that is an example of a second cylinder which is disposed further outside the outer tubular body 12. The cylinder 11, the outer tubular body 12, and the damper case 13 are concentrically (coaxially) arranged.

In the following description, a central axis direction of a cylinder of the damper case 13 is simply referred to as an axial direction. Also, an end portion side in the lower section of the drawing in the axial direction of the damper case 13 is referred to as one end portion side, and an end portion side in the upper section of the drawing in the axial direction of the damper case 13 is referred to as the other end portion side.

Also, the cylinder portion 10 includes a bottom cover 14 that blocks one end portion in the central axis direction (vertical direction in FIG. 2) of the damper case 13, a rod guide 15 that guides the piston rod 20, and an oil seal 16 that prevents oil from leaking in the cylinder portion 10 and a foreign substance from being mixed into the cylinder portion 10.

Furthermore, the cylinder portion 10 includes a rebound stopper 17 that restricts a range of movement of the piston rod 20, and a bump stopper cap 18 that is provided on the other end portion in the axial direction in the damper case 13.

The cylinder 11 (first cylinder) is a thin cylinder-shaped member. The oil is accommodated inside the cylinder 11. Also, the piston 30 is disposed on an inner circumferential surface of the cylinder 11 in such a manner as to be slidable in the axial direction, and the piston 30 moves with an outer circumference thereof being in contact with an inner circumference of the cylinder 11. Inside the cylinder 11, the piston 30 and a part of the piston rod 20 are arranged in a movable manner.

Also, the cylinder 11 includes a cylinder opening 11H that is a path through which the oil between the cylinder and a communication passage L, described later, flows on the other end portion side and toward the one side from the rod guide 15.

The outer tubular body 12 is a thin cylinder-shaped member. The outer tubular body 12 is disposed outside the cylinder 11 and inside the damper case 13. An inner circumference of the outer tubular body 12 is arranged with a predetermined gap with respect to an outer circumference of the cylinder 11. Between the outer tubular body 12 and the cylinder 11, the communication passage L is formed as a path of the oil between the inner side of the cylinder 11 and a reservoir chamber R that will be described later.

Furthermore, as shown in FIG. 3, the outer tubular body 12 includes an outer tubular body opening 12I1 at a position opposing the solenoid valve 50. Furthermore, a joint member 12G is mounted around the outer tubular body opening 12H. The joint member 12G has a cylindrical shape, and protrudes toward the solenoid valve 50 side. A suction port 52 that will be described later is inserted into the inner side of the joint member 12G.

As shown in FIG. 2, the damper case 13 (second cylinder) is formed in such a manner as to be longer than the cylinder 11 and the outer tubular body 12, and accommodates the cylinder 11 and the outer tubular body 12 on an inner side in the axial direction and a circumferential direction. Also, an inner circumference of the damper case 13 is arranged with a predetermined gap with respect to an outer circumference of the outer tubular body 12. Between the damper case 13 and the outer tubular body 12, the reservoir chamber R is formed so as to compensate for the volume of the oil that corresponds to a forward and backward movement of the piston rod 20 by absorbing the oil in the cylinder 11 or supplying the oil into the cylinder 11.

As shown in FIG. 3, the damper case 13 includes a case opening 13I1 at a position where the solenoid valve 50 (throttle mechanism) is mounted. A solenoid cylinder 50S that will be described later is mounted on an outer circumference of the damper case 13 and outside the case opening 13H. Also, a skirt member 612, described later, of the flow path restriction unit 60 is fitted inside the case opening 13H. Furthermore, the suction port 52 and the joint member 12G pass through the case opening 13H.

As shown in FIG. 2, the bottom cover 14 is mounted on the one end portion of the damper case 13 to block the one end portion of the damper case 13. The bottom cover 14 supports the bottom valve 40 via a pedestal 14M, and also supports the cylinder 11 and the outer tubular body 12 via the bottom valve 40 in the one end portion in the axial direction of the damper case 13.

The rod guide 15 is an approximately thick cylinder-shaped member, and is held by the damper case 13 on the inner circumference of the damper case 13. Also, the rod guide 15 is fixed in the axial direction in the other end portion of the damper case 13 via the oil seal 16 that is placed further toward the other end portion side than the rod guide 15.

The rod guide 15 holds the piston rod 20 via a bush or the like in a hole inside thereof, and supports the piston rod 20 in a movable manner.

Also, the rod guide 15 blocks the other end portion in the axial direction of the cylinder 11 and the outer tubular body 12 further inside than the damper case 13 in a radial direction.

The oil seal 16 is an approximately thick cylinder-shaped member, and is fixed to a seamed portion that is formed in the other end portion of the damper case 13. The oil seal 16 causes the piston rod 20 to be movable in the axial direction in a hole which is formed inside thereof.

Also, the oil seal 16 supports the cylinder 11 and the outer tubular body 12 in the other end portion in the axial direction of the damper case 13 via the rod guide 15.

The rebound stopper 17 is configured of a rebound seat 17S and a rebound rubber 17R.

The rebound seat 17S is a cylinder-shaped member, and is fixed to the outer circumference of the piston rod 20 by welding, caulking or the like. The rebound rubber 17R is a cylinder-shaped member, and moves along with the piston rod 20 in the cylinder 11 in which the oil is sealed. The rebound rubber 17R is arranged between the rod guide 15 and the rebound seat 17S in a center line direction. In FIG. 2, the rebound rubber 17R is disposed in such a manner as to be in contact with the rebound seat 17S.

During an expansion stroke of the suspension 100, the rebound stopper 17 restricts a movement of the piston rod 20 toward the other side in the axial direction within a certain level.

The bump stopper cap 18 is disposed in such a manner as to cover an outer side of the damper case 13 in the other end portion of the damper case 13. During a compression stroke of the suspension 100, the bump stopper cap 18 protects the other end portion of the hydraulic shock absorbing apparatus 1 when a shock is received by the bumper rubber 7.

Configuration and Function of Piston Rod 20

As shown in FIG. 2, the piston rod 20 extends in the axial direction and is connected to the piston 30 in the one end portion in the axial direction.

The piston rod 20 is a solid or hollow rod-shaped member, and includes a rod portion 21 that has a columnar shape or a cylindrical shape, a one side mounting portion 22a which is disposed in the one end portion in the axial direction for mounting of the piston 30 or the like, and the other side mounting portion 22b which is disposed in the other end portion in the axial direction for mounting of the piston rod 20 on the vehicle body or the like. On outer surfaces in end portions of the one side mounting portion 22a and the other side mounting portion 22b, spiral grooves are cut and external threads are formed to function as a bolt.

Configuration and Function of Piston 30

As shown in FIG. 2, the piston 30 includes a piston body 31, a valve 32 that is disposed in the other end portion side in the axial direction of the piston body 31, and a spring 33 that is disposed between the valve 32 and the one side mounting portion 22a of the piston rod 20.

The piston 30 is disposed in such a manner as to be movable in the axial direction in the cylinder 11, and partitions a space inside the cylinder 11 into a first liquid chamber and a second liquid chamber that accommodate a liquid.

The piston body 31 has a mounting hole 31R that is formed in the axial direction so as to pass the one side mounting portion 22a of the piston rod 20, and an oil passage 31H that is formed in the axial direction further radially outward than the mounting hole 31R. The oil passage 31H is formed in a plural number (four in the embodiment) at regular intervals in the circumferential direction, and forms a path through which the oil flows via the piston body 31.

The valve 32 is a disk-shaped member in which a bolt hole that passes the one side mounting portion 22a of the piston rod 20 is formed. The valve 32 is disposed in the other end portion of the piston body 31, and mounted in such a manner as to block the other sides of the plurality of oil passages 31H.

One side of the spring 33 is in contact with the valve 32, and the other side thereof is hung by a step portion that is formed at a boundary between the rod portion 21 and the one side mounting portion 22a. The spring 33 presses the valve 32 toward the other side end portion of the piston body 31.

Configuration and Function of Bottom Valve 40

As shown in FIG. 2, the bottom valve 40 includes a valve body 41 that has a plurality of oil passages which are formed in the axial direction, a valve 42 that blocks one end portions in the axial direction of some of the plurality of oil passages that are formed in the valve body 41, and a bolt 40B that fixes these members.

The valve body 41 has a disk-shaped portion 411 that has a disk shape, and a cylinder-shaped portion 412 that has a cylindrical shape and extends in the axial direction from a radially outermost portion of the disk-shaped portion 411. The valve body 41 divides a first oil chamber Y1 from the reservoir chamber R.

The disk-shaped portion 411 has a bolt hole 45R that is formed in the axial direction so as to pass a shaft of the bolt 40B, and an oil passage 46 that is formed in the axial direction further radially outward than the bolt hole 45R. The oil passage 46 is formed in a plural number (four in the embodiment) at regular intervals in the circumferential direction, and functions as a communication passage communicating the first oil chamber Y1 with the reservoir chamber R.

The cylinder-shaped portion 412 forms a space 412H inside the cylinder, and includes a plurality (four in the embodiment) of concave portions 44 at regular intervals in the circumferential direction, the concave portions being recessed from an end surface on the one end portion side in the axial direction. The concave portion 44 allows an inner portion of the cylinder-shaped portion 412 to communicate with the reservoir chamber R.

The valve 42 is a disk-shaped member in which a bolt hole is formed to pass the shaft of the bolt 40B. Furthermore, the valve 42 has an outer diameter large enough to block the other end portion of the oil passage 46.

Configuration and Function of Solenoid Valve 50

The solenoid valve 50 is disposed in a side portion of the damper case 13. As shown in FIG. 3, the solenoid valve 50 includes the solenoid cylinder 50S, a solenoid mechanism unit 51, the suction port 52, a valve stopper 53, a valve element 54, a spring 55, and a discharge ring 56.

The solenoid cylinder 50S is a cylindrical-shaped member, and is disposed in such a manner that an opening on one side in the axial direction opposes the case opening 13H of the damper case 13. In the embodiment, the solenoid cylinder 50S is disposed toward a direction crossing the axial direction on a side of the damper case 13.

The solenoid mechanism unit 51 has a coil 511, a housing 511H, a plunger 512, a magnetic body 513, and a fixed core 514.

The coil 511 is disposed along the axial direction of the plunger 512, and is held by the housing 511H. A conducting wire that is not shown herein is connected to the coil 511, and a magnetic field is generated when power is received via the conducting wire. Control of the electric conduction with respect to the coil 511 is performed by a control unit that is not shown herein.

The plunger 512 is supported by the housing 511H in such a manner as to be movable in the axial direction via a bearing. The magnetic body 513 such as a magnet is fixed to and mounted on the plunger 512. The plunger 512 is in contact with the valve element 54 on the one end portion side.

The fixed core 514 is arranged further toward the valve element 54 side than the magnetic body 513 in the axial direction of the plunger 512. The fixed core 514 is configured in such a manner as to receive the magnetic field that is generated by the electric conduction of the coil 511 for excitation of the core.

The suction port 52 is an approximately cylindrical-shaped member. In the embodiment, the suction port 52 has a one end side opening portion 521, and the other end side opening portion 522 whose diameter is relatively larger than a diameter of the one end side opening portion 521. The one end side opening portion 521 is fitted into the inner side of the joint member 12G of the outer tubular body 12 via a seal member, and opposes the solenoid mechanism unit 51 in the other end side opening portion 522 across the discharge ring 56.

The valve stopper 53 is a thick cylindrical-shaped member in which an annular flow path 53r for the oil is formed. The valve stopper is mounted inside the other end side opening portion 522 of the suction port 52.

The valve element 54 is a columnar member, and has a tip end portion 54p that protrudes in a columnar shape in the axial direction in a central portion. The valve element 54 is disposed in such a manner that the tip end portion 54p opposes the valve stopper 53, and is configured in such a manner that the tip end portion 54p is fitted into the annular flow path 53r. Also, the valve element 54 moves in the axial direction by receiving a force from the plunger 512 on a side opposite from the valve stopper 53.

The spring 55 is disposed between the valve stopper 53 and the valve element 54, and exerts a spring force in a direction in which a gap between the valve stopper 53 and the valve element 54 widens.

The discharge ring 56 is a columnar member, and has a plurality of circular openings in the circumferential direction on an outer circumferential surface. The discharge ring 56 is placed around the valve stopper 53, the valve element 54, and the spring 55, and discharges the oil that passes a throttle unit V that will be described later to a cylinder inner chamber 50R.

In the embodiment, the throttle unit V for the oil in the solenoid valve 50 is formed by the annular flow path 53r of the valve stopper 53 and the tip end portion 54p of the valve element 54. In other words, the solenoid valve 50 according to the embodiment generates a damping force by throttling a flow path cross section of the oil in the throttle unit V. Furthermore, the damping force is adjusted by changing a distance of the valve element 54 with respect to the valve stopper 53 using the plunger 512 of the solenoid mechanism unit 51 and by changing a flow path cross-sectional area of the flow of the oil.

Figure 4:
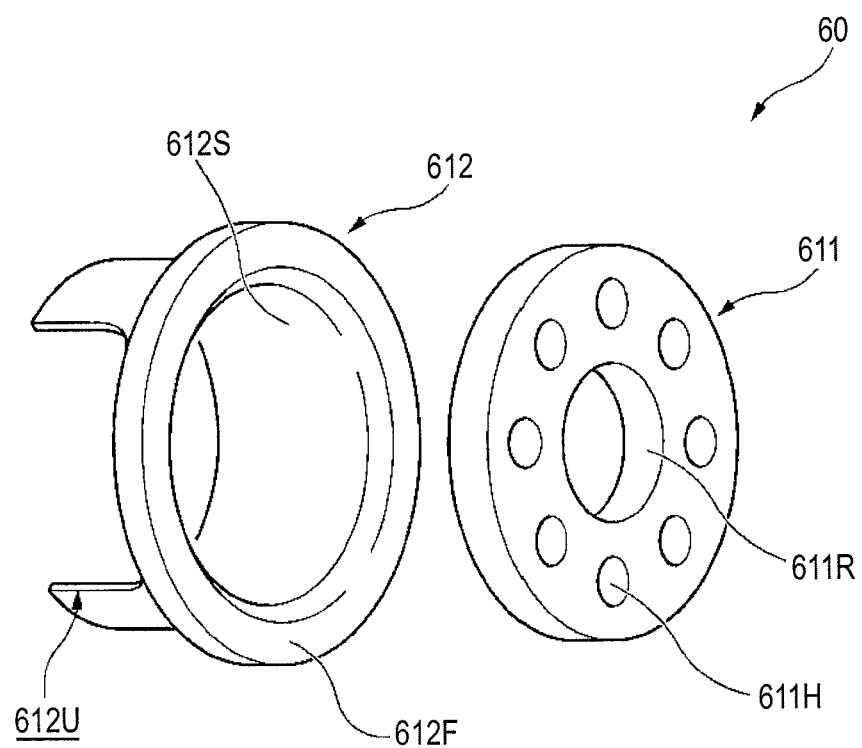
FIG. 4 is an explanatory diagram showing a flow path restriction unit according to the embodiment.

FIG. 4 is an explanatory diagram showing the flow path restriction unit 60 according to the embodiment.

Configuration and Function of Flow Path Restriction Unit 60

The flow path restriction unit 60 (restriction unit) is configured of a rectification member 611 and the skirt member 612. The flow path restriction unit 60 restricts a direction of the oil discharged to the cylinder inner chamber 50R so as to suppress rippling on an oil surface and prevent generation of air bubbles.

As shown in FIG. 4, the rectification member 611 is a disk-shaped member that includes an opening 611R and an oil passage 611H.

The opening 611R is formed in such a manner as to have an inner diameter that is larger than an outer diameter of the one end side opening portion 521. Also, an outer diameter of the rectification member 611 is set to be smaller than an inner diameter of the solenoid cylinder 505. The one end side opening portion 521 of the suction port 52 passes through the opening 611R of the rectification member 611, and the rectification member is placed radially outside the one end side opening portion 521, and is disposed inside the solenoid cylinder 50S. The rectification member 611 is pinched by the skirt member 612 and the other end side opening portion 522, and thus is held by the solenoid cylinder 50S in the solenoid valve 50.

The rectification member 611 does not necessarily have to be pinched by the other end side opening portion 522 to be held by the solenoid cylinder 50S. The rectification member 611 may be held by the solenoid cylinder 50S by using another configuration.

The oil passage 611H is a through hole that is formed in the axial direction in the rectification member 611. In the embodiment, the oil passage 611H is disposed in a plural number (for example, eight points) at regular intervals in the circumferential direction. Also, a flow path cross-sectional area of the oil passage 611H is formed to be smaller than a flow path cross-sectional area (cross-sectional area formed in the axial direction by the outer tubular body 12 and the damper case 13) of the reservoir chamber R. Furthermore, the flow path cross-sectional area of the oil passage 611H is formed to be larger than a flow path cross-sectional area in the throttle unit V.

As shown in FIG. 4, the skirt member 612 is configured of a cylindrical portion 612S, and a flange portion 612F that is disposed on one side in a cylinder axis direction.

The cylindrical portion 612S is formed in such a manner as to have an outer diameter that is approximately equal to an inner diameter of the case opening 13H. Also, the cylindrical portion 612S is formed in such a manner as to have an inner diameter that is larger than an outer diameter of the joint member 12G. Furthermore, an end portion of the cylindrical portion 612S opposite to a side connected to the flange portion 612F is shaped along an outer circumferential surface of the outer tubular body 12.

Furthermore, the cylindrical portion 612S has a notch portion 612U that is formed in such a manner as to be cut in a U shape from an end portion toward the flange portion 612F side. In the embodiment, the notch portion 612U is configured in such a manner as to be directed toward the one side end portion where the bottom valve 40 is placed in a state where the cylindrical portion 612S of the skirt member 612 is mounted along the outer circumferential surface of the outer tubular body 12.

The flange portion 612F is formed on one end side of the cylindrical portion 612S, and is a point protruding radially outward with an outer diameter formed in such a manner as to be larger than the outer diameter of the cylindrical portion 612S. Also, the flange portion 612F is formed in such a manner as to have an outer diameter that is approximately equal to the inner diameter of the solenoid cylinder 50S. Furthermore, an opening on the flange portion 612F side is formed in such a manner as to be larger than an outer edge of an area formed by the plurality of oil passages 611H in the rectification member 611.

The skirt member 612 is held by the solenoid valve 50 in such a manner that the flange portion 612F is mounted on an inner circumference of the solenoid cylinder 50S. Also, the skirt member 612 is set to face the rectification member 611. Furthermore, the skirt member 612 opposes the outer circumferential surface of the outer tubular body 12 as the cylindrical portion 612S extends toward the outer circumferential surface of the outer tubular body 12. The skirt member 612 surrounds the joint member 12G and the one end side opening portion 521 of the suction port 52.

In the flow path restriction unit 60 that has the above-mentioned configuration, the direction of the oil discharged from the throttle unit V of the solenoid valve 50 toward the cylinder inner chamber 50R is restricted to the one side, the rippling on the oil surface are suppressed, and the generation of the air bubbles is prevented.

Also, the skirt member 612 is disposed in such a manner as to surround a point where the liquid is discharged from the solenoid valve 50 toward the reservoir chamber R. Therefore, the skirt member 612 holds the oil in a closed manner (discharged from the solenoid valve 50) in the skirt member 612, and suppresses the oil from being diffused in the reservoir chamber R.

Furthermore, when the oil flows toward the reservoir chamber R in the skirt member 612, the oil is restricted so as to flow through the notch portion 612U. Therefore, mixing of air with the oil is restricted in this case. As described above, the oil is squeezed in a narrow space in the skirt member 612, and thus the oil flows out from the notch portion 612U while the mixing with the air bubbles is prevented.

The oil that is prevented from mixing with the air by using the rectification member 611 and the skirt member 612 as described above enters into a state where only the air whose volume poses no problem is contained when, for example, the damping force is generated in the bottom valve 40 and the piston 30. In other words, substantially no air bubbles are in the oil in terms of the generation of the damping force, and the air bubbles themselves are suppressed by the rectification member 611 and the skirt member 612. A delay in the generation of the damping force is suppressed in the hydraulic shock absorbing apparatus 1, and it is possible to generate the predetermined amount of the damping force.

The notch portion 612U may be mounted, for example, in such a manner as to be directed toward the other side in the axial direction. However, in the embodiment, the notch portion 612U is mounted toward the one side in the axial direction and thus, in the reservoir chamber R for example, a relatively large amount of air bubbles of the air that is taken in when liquid surface ripples are present on a boundary with the air and the liquid. In this configuration, the oil containing the air bubbles is unlikely to enter the cylinder inner chamber 50R when the liquid surface is lowered toward the one side.

Also, in the flow path restriction unit 60 (restriction unit), both of the rectification member 611 and the skirt member 612 do not necessarily have to be disposed at the same time. In other words, the air bubbles in the oil may be suppressed by forming the flow path restriction unit 60 with only either one of the rectification member 611 and the skirt member 612.

Figure 5A:
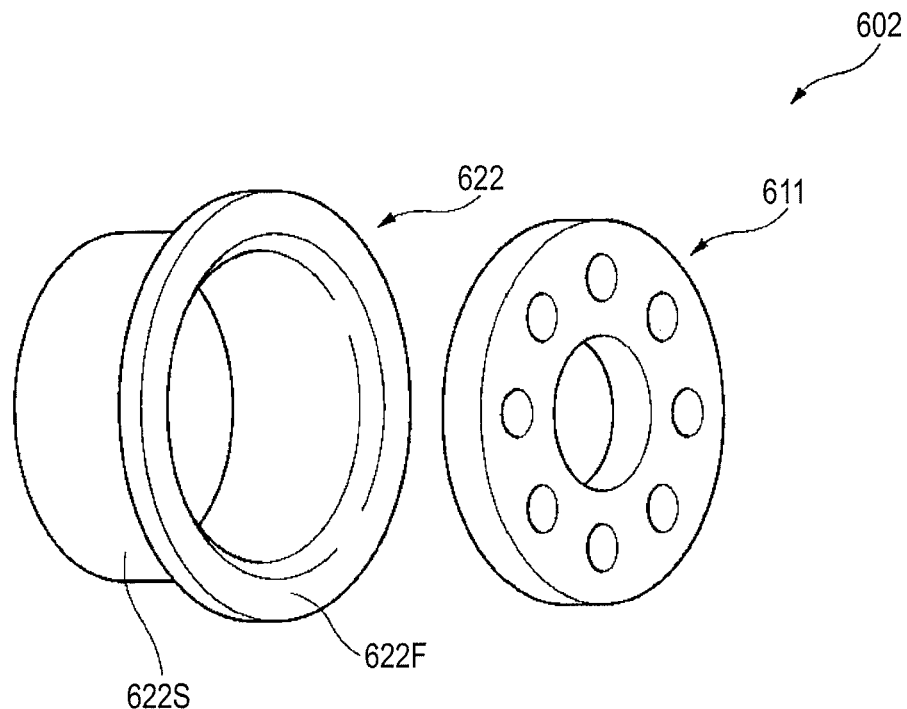
FIGS. 5A and 5B are explanatory diagrams showing flow path restriction units according to a modification example.
Figure 5B:
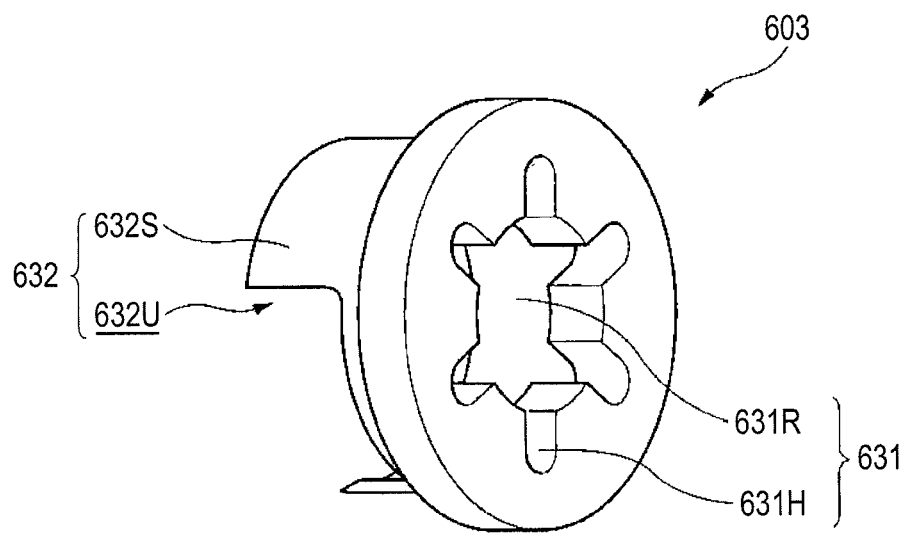

FIGS. 5A and 5B are explanatory diagrams showing flow path restriction units according to a modification example.

FIG. 5A shows a second flow path restriction unit 602 according to the modification example, and FIG. 5B shows a third flow path restriction unit 603 according to the modification example.

The second flow path restriction unit 602 (restriction unit) is configured of the rectification member 611 and a second skirt member 622. The second skirt member 622 has a cylindrical portion 622S and a flange portion 622F. The second flow path restriction unit 602 suppresses the rippling on the liquid surface by controlling the flow of the oil discharged toward the cylinder inner chamber 50R. As a result, the generation of the air bubbles in the oil is prevented.

The cylindrical portion 622S is formed in such a manner as to have an outer diameter that is approximately equal to the inner diameter of the case opening 13H (refer to FIG. 3), and is disposed inside the case opening 13H. Also, the cylindrical portion 622S is formed in such a manner as to have an inner diameter that is larger than the outer diameter of the joint member 12G (refer to FIG. 3), and is arranged outside the joint member 12G. An end portion of the cylindrical portion 622S opposite to the side connected to the flange portion 622F is not formed along the outer circumferential surface of the outer tubular body 12, but a cross section of the cylinder that is cut straight in a direction orthogonal to the axial direction has a circular shape.

The flange portion 622F is formed on the one end side of the cylindrical portion 622S, is formed in such a manner as to have an outer diameter which is larger than the outer diameter of the cylindrical portion 622S, and is a point that protrudes radially outward. Also, the outer diameter of the flange portion 622F is formed in such a manner as to be approximately equal to the inner diameter of the solenoid cylinder 50S. Furthermore, an opening on the flange portion 622F side is formed to be larger than an outer edge of an area formed by the plurality of oil passages 611H in the rectification member 611.

The second skirt member 622 is held by the solenoid valve 50 in such a manner that the flange portion 622F is mounted on the inner circumference of the solenoid cylinder 50S. Also, in this state, the second skirt member 622 is set to face the rectification member 611.

Furthermore, the second skirt member 622 is disposed in such a manner that the cylindrical portion 622S extends toward the outer circumferential surface of the outer tubular body 12. The second skirt member 622 surrounds the one end side opening portion 521 of the joint member 12G and the suction port 52 (refer to FIG. 3). Also, the end portion of the cylindrical portion 622S is not formed along the outer circumferential surface of the outer tubular body 12, and thus a gap is formed between the outer tubular body 12 and the end portion of the cylindrical portion. Therefore, the oil that flows via the second skirt member 622, as will be described later, flows out from the gap, and the gap forms an outflow portion from the second skirt member 622 toward the reservoir chamber R.

Subsequently, the third flow path restriction unit 603 will be described referring to FIG. 5B.

The third flow path restriction unit 603 (restriction unit) is configured of a rectification unit 631 and a skirt portion 632 that is integrally formed with the rectification unit 631. The third flow path restriction unit 603 suppresses the rippling on the liquid surface by controlling the flow of the oil discharged toward the cylinder inner chamber 50R. As a result, the generation of the air bubbles in the oil is prevented.

The rectification unit 631 is a disk-shaped portion that has an opening 631R inside thereof, and an oil passage 631H that is formed around the opening 631R.

The rectification unit 631 is formed in such a manner as to have an outer diameter that is approximately equal to the inner diameter of the solenoid cylinder 50S. Also, the opening 631R is set in such a manner as to have an inner diameter that is larger than the outer diameter of the one end side opening portion 521 of the suction port 52. The third flow path restriction unit 603 is held by the solenoid valve 50 in such a manner that the rectification unit 631 is mounted on the inner circumference of the solenoid cylinder 50S.

The oil passage 631H is a through hole that is formed in the axial direction. In the embodiment, the oil passage 631H is disposed in a plural number (for example, six points) at regular intervals in the circumferential direction. The oil passage 631H is formed in such a manner as to continue to the opening 631R. A flow path cross-sectional area of the oil passage 631H is formed to be smaller than the flow path cross-sectional area of the reservoir chamber R. Furthermore, the flow path cross-sectional area of the oil passage 631H is formed to be larger than the flow path cross-sectional area in the throttle unit V (refer to FIG. 3).

The skirt portion 632 has a cylindrical portion 632S. The cylindrical portion 632S is set in such a manner as to have an outer diameter that is approximately equal to the inner diameter of the case opening 1311 (refer to FIG. 3), and is disposed inside the case opening 13H. Also, the cylindrical portion 632S is formed in such a manner as to have an inner diameter that is larger than the outer diameter of the joint member 12G (refer to FIG. 3), and is disposed outside the joint member 12G. Furthermore, the end portion of the cylindrical portion 632S on the outer tubular body 12 side is shaped along the outer circumferential surface of the outer tubular body 12.

Furthermore, the cylindrical portion 632S has a notch portion 632U that is formed in such a manner as to be cut in a U shape from an end portion toward the rectification unit 631 side. In the embodiment, the notch portion 632U is configured in such a manner as to be directed toward the one side end portion where the bottom valve 40 is placed in a state where the third flow path restriction unit 603 is mounted along the outer circumferential surface of the outer tubular body 12.

The third flow path restriction unit 603 is mounted inside the solenoid cylinder 50S in a state where the opening 631R is inserted into the suction port 52. In this state, the third flow path restriction unit 603 opposes the outer circumferential surface of the outer tubular body 12 with the skirt portion 632 extending toward the outer circumferential surface of the outer tubular body 12. The third flow path restriction unit 603 surrounds the one end side opening portion 521 of the joint member 12G and the suction port 52.

As described above, each of the second flow path restriction unit 602 and the third flow path restriction unit 603 according to the modification example is held by the solenoid cylinder 50S, and reduces the volume of the air bubbles in the oil. As a result, a delay in the generation of the damping force is suppressed in the hydraulic shock absorbing apparatus 1, and it is possible to generate the predetermined amount of the damping force. Also, the second flow path restriction unit 602 and the third flow path restriction unit 603 are held by the solenoid cylinder 50S, and thus it is possible to raise the positioning accuracy with respect to a discharge point of the oil from the solenoid cylinder 50S.

In the second flow path restriction unit 602 (restriction unit), the rectification member 611 does not necessarily have to be assembled with the second skirt member 622. The air bubbles in the oil may be suppressed by forming the second flow path restriction unit 602 by using only the second skirt member 622.

Configuration and Function of Check Valve Mechanism 70

Figure 6:
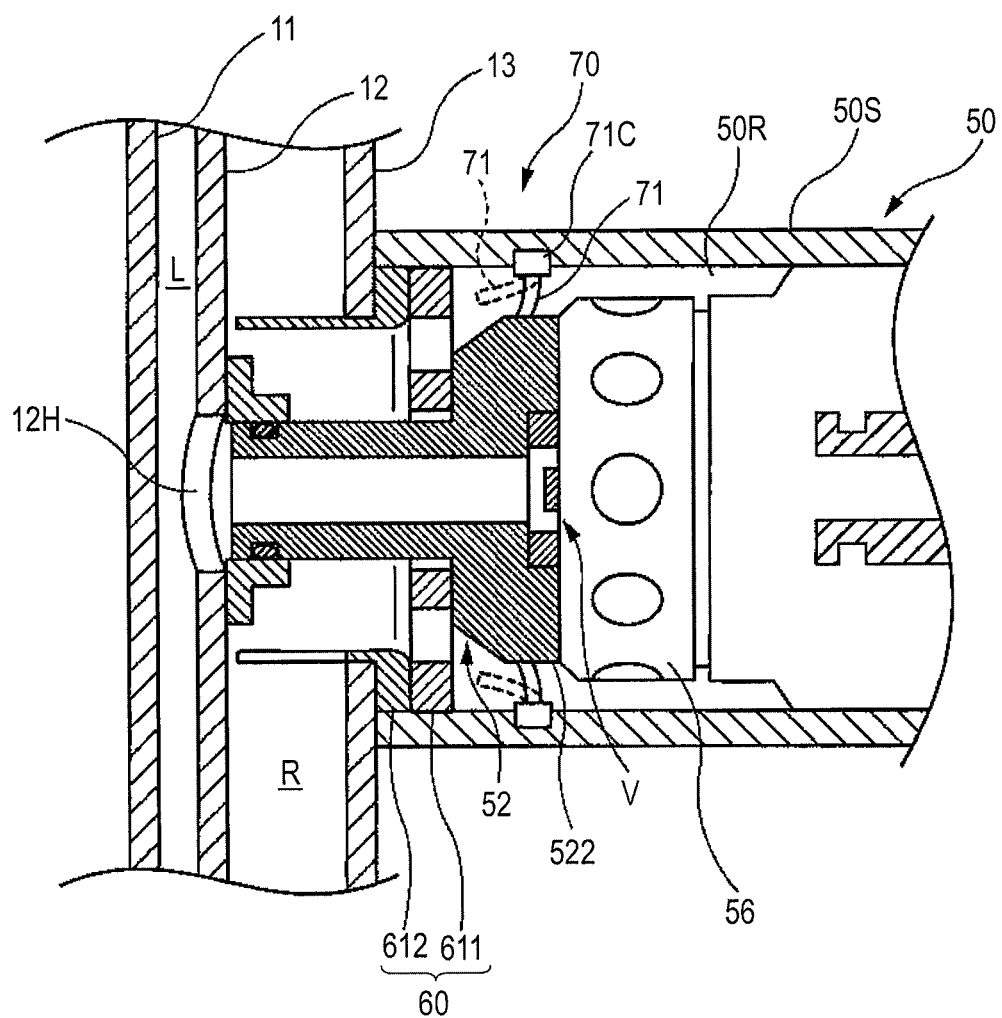
FIG. 6 is an explanatory diagram showing a check valve mechanism according to the embodiment.

FIG. 6 is an explanatory diagram showing the check valve mechanism 70 according to the embodiment.

The check valve mechanism 70 (allowance restriction unit) is configured of a check valve 71, and a holding body 71C that holds the check valve 71.

The check valve 71 is a disk-shaped member that has an opening. Also, the check valve 71 is formed of a material that can be deformed in response to the resistance of the flow of the oil. Inside the solenoid cylinder 50S, the check valve 71 is disposed at a position that opposes the outer circumference of the other end side opening portion 522 of the suction port 52. The inner diameter of the check valve 71 is formed to be larger than the outer diameter of the other end side opening portion 522. Also, the outer diameter of the check valve 71 is formed to be approximately equal to the inner diameter of the solenoid cylinder 50S.

Also, the check valve 71 is configured to be deformed when the flow of the oil from the throttle unit V toward the reservoir chamber R is received and to be unlikely to be deformed when the flow of the oil from the reservoir chamber R toward the throttle unit V is received.

The holding body 71C is an tonic member, and is fixed to the inner circumference of the solenoid cylinder 50S. The holding body 71C holds an outer circumferential portion of the check valve 71 in such a manner as to be capable of deforming an inner circumferential portion side of the check valve 71.

The check valve mechanism 70 that has the above-described configuration prevents the rippling on the liquid surface by controlling the flow of the fluid that is the oil and the air in the cylinder inner chamber 50R by using the check valve 71 which is held by the solenoid cylinder 50S. As a result, the generation of the air bubbles in the oil is prevented. In other words, the check valve mechanism 70 allows the fluid to flow from the throttle unit V toward the reservoir chamber R, and restricts the flow of the fluid from the reservoir chamber R to the throttle unit V side. For example, when the liquid surface of the reservoir chamber R is lowered, the air or the oil near the liquid surface that contains a relatively large amount of the air bubbles do not enter the throttle unit V.

The check valve mechanism 70 suppresses the oil that contains large air bubbles and the air itself from entering the cylinder inner chamber 50R, and thus, when the solenoid valve 50 is in operation in the following operation, suppresses the oil containing the large air bubbles and the air from being mixed with the oil discharged from the throttle unit V and being supplied to the bottom valve 40 (refer to FIG. 2) side of the reservoir chamber R. The check valve mechanism 70 can reduce the amount of the air bubbles in the liquid. As a result, a delay in the generation of the damping force is suppressed in the hydraulic shock absorbing apparatus 1, and it is possible to generate the predetermined amount of the damping force.

Subsequently, check valve mechanisms according to the modification example will be described.

Figure 7A:
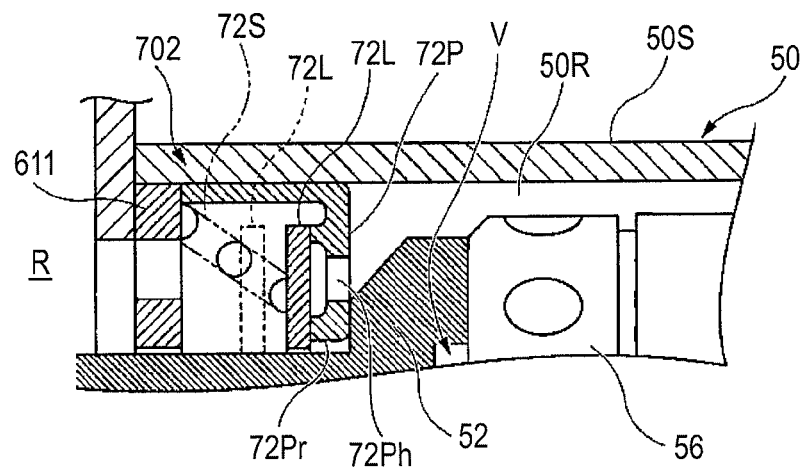
FIGS. 7A to 7C are explanatory diagrams showing check valve mechanisms according to the modification example.
Figure 7B:
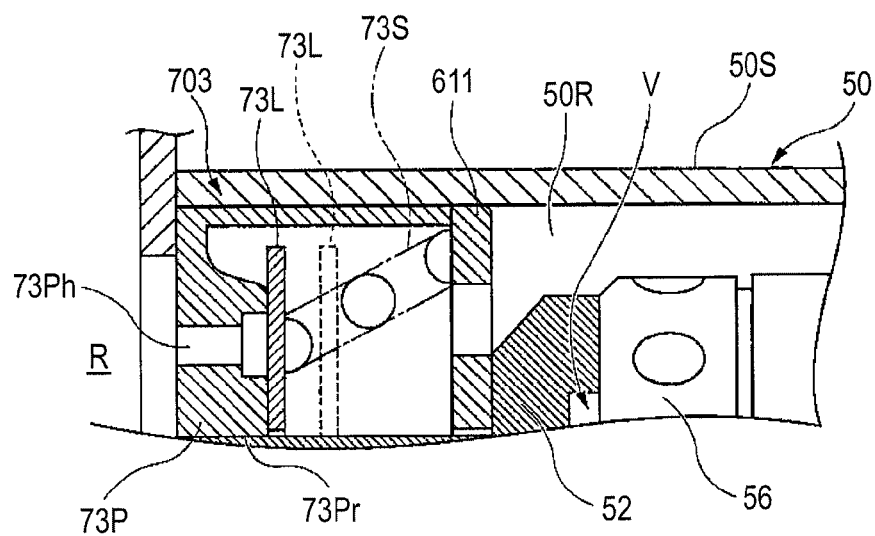
Figure 7C:
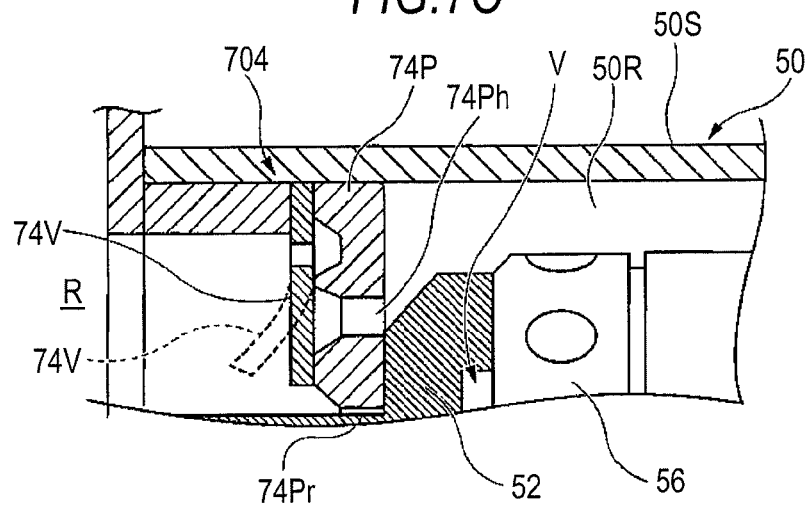

FIGS. 7A to 7C are explanatory diagrams showing the check valve mechanisms according to the modification example.

FIG. 7A shows a second check valve mechanism 702 according to the modification example, FIG. 7B shows a third check valve mechanism 703 according to the modification example, and FIG. 7C shows a fourth check valve mechanism 704 according to the modification example.

As shown in FIG. 7A, the second check valve mechanism 702 (allowance restriction unit) includes an oil passage formation member 72P, a lift valve 72L, and a spring 72S in the cylinder inner chamber 50R.

The oil passage formation member 72P is a bottomed cylindrical-shaped member, and has a through hole 72Pr that passes the suction port 52 and an oil passage 72Ph that is a flow path for the oil on the bottom surface. The oil passage formation member 72P is mounted further toward a back side of the cylinder inner chamber 50R than the rectification member 611.

The lift valve 72L is a disk-shaped member that has an opening which passes the suction port 52 in a center thereof. An outer diameter of the lift valve 72L is configured in such a manner as to be capable of covering the oil passage 72Ph which is provided in a plural number. The lift valve 72L is arranged on the reservoir chamber R side of the oil passage formation member 72P. The lift valve 72L blocks the plurality of oil passages in a state where the lift valve is in contact with the oil passage formation member 72P.

The spring 72S is in contact with the lift valve 72L on one end side in a direction of expansion and contraction, and is hung by the rectification member 611 on the other side. A spring force of the spring 72S is set in such a manner as to be capable of being reduced in response to the resistance of the flow from the throttle unit V toward the reservoir chamber R.

In the second check valve mechanism 702, the oil passage formation member 72P, the lift valve 72L, and the spring 72S that are held by the solenoid cylinder 50S control the flow of the fluid that is the oil and the air in the cylinder inner chamber 50R, and thus suppress the rippling on the oil surface and prevent the generation of the air bubbles in the oil. In other words, in the second check valve mechanism 702, the lift valve 72L allows the fluid to flow from the throttle unit V toward the reservoir chamber R as the lift valve 72L is separated from the oil passage 72Ph, and restricts the flow of the fluid from the reservoir chamber R toward the throttle unit V as the lift valve 72L blocks the oil passage 72Ph as shown by the dashed line in FIG. 7A.

As shown in FIG. 7B, the third check valve mechanism (allowance restriction unit) 703 includes an oil passage formation member 73P, a lift valve 73L, and a spring 73S in the cylinder inner chamber 50R.

The oil passage formation member 73P is a bottomed cylindrical-shaped member, and has a through hole 73Pr that passes the suction port 52 and an oil passage 73Ph that is a flow path for the oil on the bottom surface. The oil passage formation member 73P is arranged further toward the reservoir chamber R side than the rectification member 611 in the cylinder inner chamber 50R.

The lift valve 73L is a disk-shaped member that has an opening which passes the suction port 52 in a center thereof. The outer diameter of the lift valve 73L is configured in such a manner as to be capable of covering the oil passage 73Ph which is provided in a plural number. The lift valve 73L is arranged on the throttle unit V side of the oil passage formation member 73P. The lift valve 72L blocks the plurality of oil passages 73Ph in a state where the lift valve is in contact with the oil passage formation member 73P, and radially protrudes from an end portion of the oil passage formation member 73P.

The spring 73S is in contact with the lift valve 73L on the one end side in the direction of expansion and contraction, and is hung by the rectification member 611 on the other side. A spring force of the spring 73S is set in such a manner as to be capable of being reduced in response to the resistance of the flow from the throttle unit V side toward the reservoir chamber R.

In the third check valve mechanism 703, the oil passage formation member 73P, the lift valve 73L, and the spring 73S that are held by the solenoid cylinder 50S control the flow of the fluid that is the oil and the air in the cylinder inner chamber 50R, and thus suppress the rippling on the oil surface and prevent the generation of the air bubbles in the oil. In other words, in the third check valve mechanism 703, the flow of the fluid from the throttle unit V to the reservoir chamber R is allowed as the lift valve 73L pressed by the fluid returning to the radially protruding portion (portion that further protrudes in the radial direction than a cross section of the oil passage formation member 73P) of the lift valve 73L, which is shown with the dashed line in FIG. 7B, is separated from the oil passage 73Ph, and the flow of the fluid from the reservoir chamber R toward the throttle unit V side is restricted as the lift valve 73L blocks the oil passage 73Ph by using the spring force of the spring 73S. Pressure of the fluid on the reservoir chamber R side depends on pressure of the air of the reservoir chamber R, and thus pressure of the cylinder inner chamber 50R is high. Therefore, it is possible to operate the lift valve 73L as described above by using the spring 73S.

As shown in FIG. 7C, the fourth check valve mechanism 704 (allowance restriction unit) includes an oil passage formation member 74P, and a bending valve 74V in the cylinder inner chamber 50R.

The oil passage formation member 74P is a disk-shaped member, and has a through hole 74Pr that passes the suction port 52 and an oil passage 74Ph that is a flow path for the oil.

The bending valve 74V is a disk-shaped member that has an opening inside thereof, and is formed of an elastic material that can be deformed in response to the resistance of the flow of the fluid. The bending valve 74V is formed in such a manner as to have an outer diameter that is smaller than the inner diameter of the cylinder inner chamber 50R, and as to have an inner diameter that is larger than the outer circumference of the suction port 52.

In the fourth check valve mechanism 704, the oil passage formation member 74P and the bending valve 74V that are held by the solenoid cylinder 50S control the flow of the fluid that is the oil and the air in the cylinder inner chamber 50R, and thus suppress the rippling on the oil surface and prevent the generation of the air bubbles in the oil. In other words, in the fourth check valve mechanism 704, the flow of the fluid from the throttle unit V to the reservoir chamber R is allowed as the bending valve 74V is deformed and is separated from the oil passage 74Ph as shown in the dashed line in FIG. 7C, and the flow of the fluid from the reservoir chamber R toward the throttle unit V side is restricted as the bending valve 74V blocks the oil passage.

As described above, the second check valve mechanism 702, the third check valve mechanism 703, and the fourth check valve mechanism 704 according to the modification example are held by the solenoid cylinder 50S, and suppresses the oil containing large air bubbles and the air itself from entering the cylinder inner chamber 50R, and thus, when the solenoid valve 50 is in operation in the following operation, suppress the oil containing the large air bubbles and the air from being mixed with the oil discharged from the throttle unit V and being supplied to the bottom valve 40 (refer to FIG. 2) side of the reservoir chamber R. As a result, it is possible to prevent the generation of the air bubbles in the liquid.

In the check valve mechanisms 702, 703, and 704 according to the modification example, the oil passage of the oil passage formation member serves also a function of the rectification member 611 in that the oil is passed to the oil passage which has a predetermined inner diameter after passing through the throttle unit V. Therefore, in a case where the configuration of the check valve mechanisms according to the modification example is employed, the rectification member 611 may be omitted.

Configuration and Function of Baffle Member 80

Figure 8:
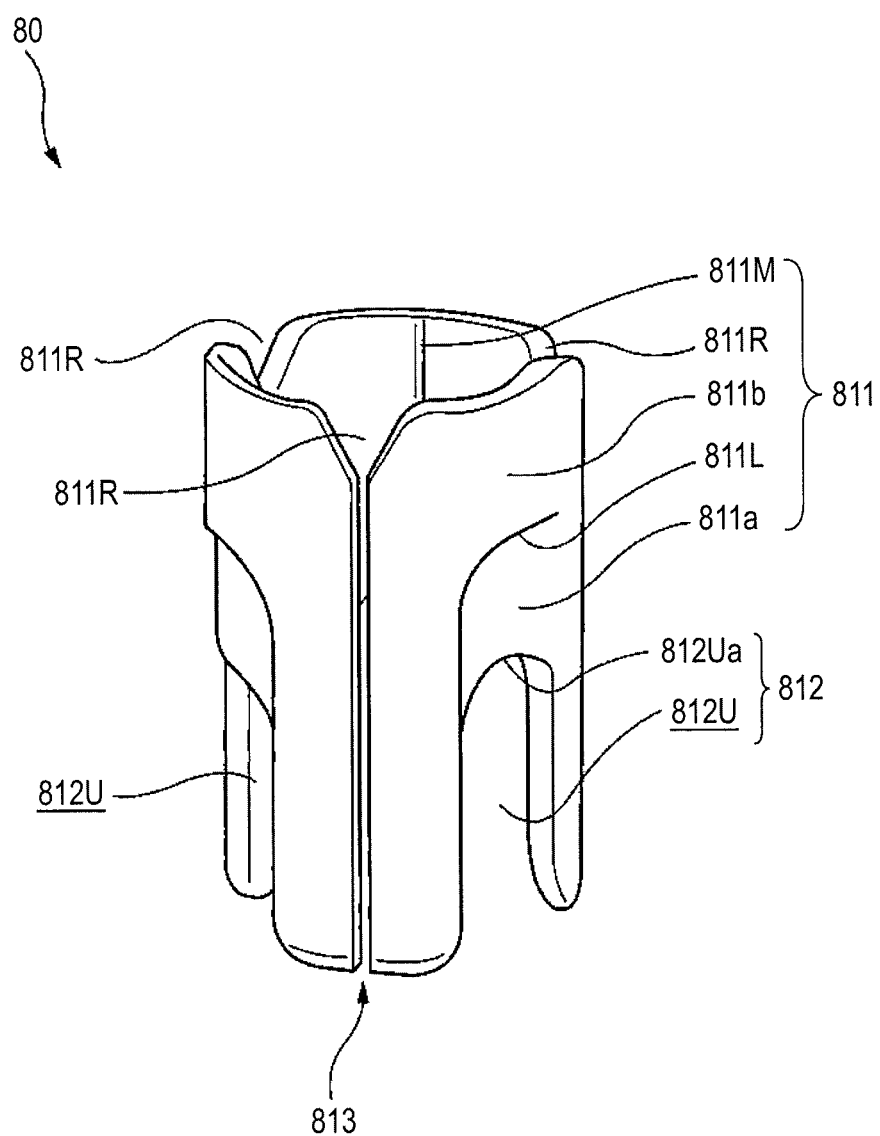
FIG. 8 is an explanatory diagram showing a baffle member according to the embodiment.

FIG. 8 is an explanatory diagram showing the baffle member 80 according to the embodiment.

As shown in FIG. 8, the baffle member 80 (inter-cylinder regulation unit) includes an annular member (insertion member). Here, the meaning of "annular" includes "approximately annular". And, the baffle member 80 is disposed in such a manner as to be coupled with the outer circumferential surface of the outer tubular body 12. The baffle member 80 includes a cylindrical portion 811, a guide unit 812, and a groove portion 813.

The cylindrical portion 811 has an approximately cylindrical shape. The cylindrical portion 811 is formed in such a manner as to have an inner diameter that is approximately equal to the outer circumference of the outer tubular body 12.

Also, the cylindrical portion 811 is formed in such a manner as to have an outer diameter that is smaller than the inner diameter of the damper case 13.

Furthermore, the cylindrical portion 811 is configured of a first thick portion 811a which is arranged on the guide unit 812 side and whose thickness in the radial direction is thin, and a second thick portion 811b that is thicker than the first thick portion 811a. A step portion 811L is formed between the first thick portion 811a and the second thick portion 811b. The step portion 811L is disposed at a position that continues to a tip end of a notch portion 812U of the guide unit 812.

Also, the cylindrical portion 811 has a receiving portion 811R on a side opposite in the cylinder axis direction to a side where the guide unit 812 is formed.

As shown in FIG. 8, the receiving portion 811R is a V-shaped concave portion that extends toward an inner side in the cylinder axis direction from an end portion of the cylindrical portion 811. The receiving portion 811R forms a portion that receives hanging of a jig or the like when the baffle member 80 is inserted between the outer tubular body 12 and the damper case 13 and alignment in the circumferential direction is performed.

The receiving portion 811R may have a surface directed toward the circumferential direction so that the hanging in the circumferential direction is received when the alignment in the circumferential direction is performed, and is not limited to the above-described V-shaped concave portion. For example, the receiving portion 811R may be formed by a protrusion that protrudes in the axial direction from the end portion of the cylindrical portion 811 to form the surface directed toward the circumferential direction.

Furthermore, the cylindrical portion 811 has a ridge portion 811M that protrudes on the inner circumferential surface and extends along the axial direction. The ridge portion 811M is disposed in a plural number (three in the embodiment), and the ridge portions are arranged at regular intervals in the circumferential direction. The baffle member 80 is mounted in such a manner that the ridge portion 811M which is disposed in the inner circumferential portion is in contact with the outer circumferential surface of the outer tubular body 12 and surrounds the outer tubular body 12.

The ridge portion 811M that is formed on the inner circumferential surface of the cylindrical portion 811 holds the baffle member 80 itself at a predetermined position with respect to the outer tubular body 12, and also regulates the flow of the oil.

Furthermore, the ridge portion 811M creates the flow of a moderate amount of the oil between the ridge portion and the outer tubular body 12. For example, when the temperature of the baffle member 80 increases as the piston 30 in the cylinder 11 slides to generate frictional heat, the temperature of the baffle member 80 itself can be lowered by the flow of the oil between the outer tubular body 12 and the baffle member 80. Therefore, for example, the positional relationship of the baffle member 80 with respect to the solenoid valve 50 is maintained as thermal deformation of the baffle member 80 is suppressed. As a result, it is possible to keep suppressing the air bubbles over a long period of time by using the baffle member 80, as will be described later.

In the guide unit 812, the notch portion 812U that extends along the cylinder axis direction is formed in a plural number (three in the embodiment) in the circumferential direction. The width of the opening formed by the notch portion 812U is set to be approximately equal to the outer diameter of the skirt member 612 of the above-described flow path restriction unit 60. Furthermore, the guide unit 812 has an end portion 812Ua at the position that continues to the tip end of the notch portion 812U. The width of the end portion 812Ua gradually decreases toward the center line direction. Also, in the embodiment, the end portion 812Ua is formed along an outer shape of the skirt member 612 as described above. It is conceivable that the end portion 812Ua is formed in a curved shape such as an arc shape.

The groove portion 813 is formed along the cylinder axis direction of the baffle member 80, and is formed in such a manner as to pass through the thickness direction of the baffle member 80. The groove portion 813 absorbs strain in the circumferential direction when creep deformation occurs in the baffle member 80. Therefore, an impact on the baffle member 80, such as the load increasing locally in a press-fit portion between the outer tubular body 12 and the baffle member 80, is reduced when the deformation occurs.

Figure 11:
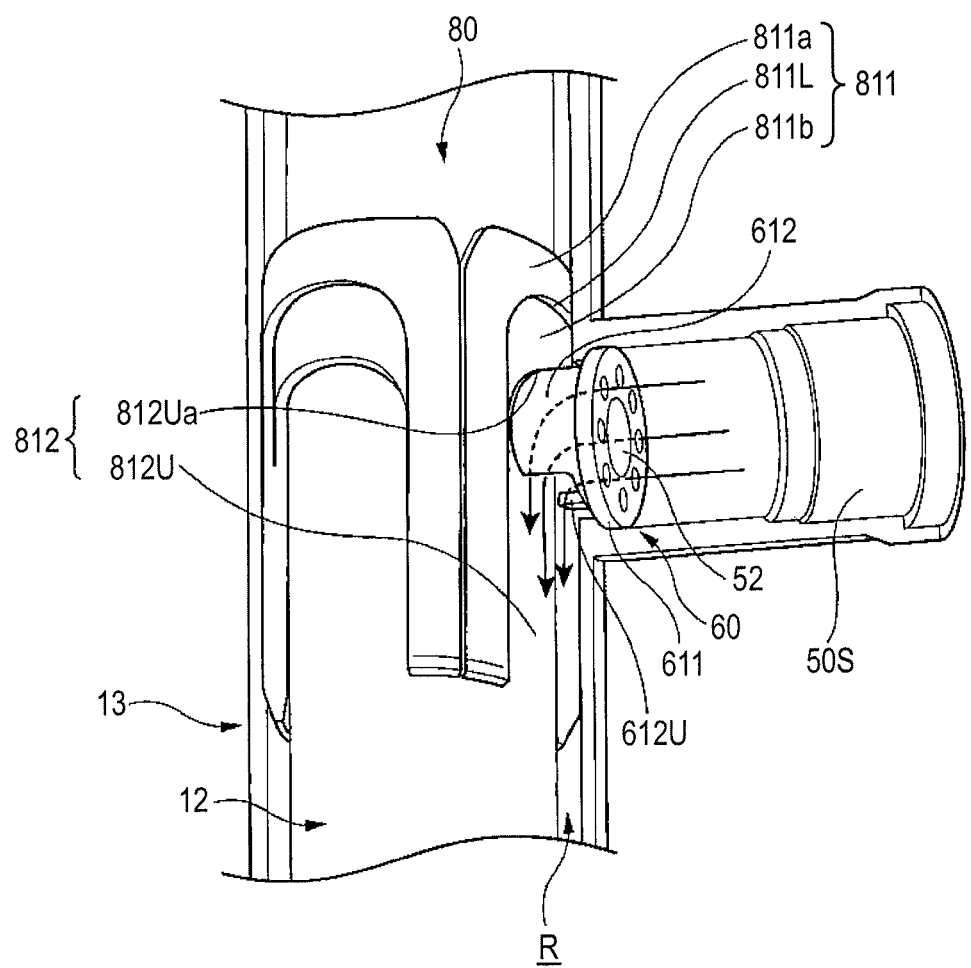
FIG. 11 is an explanatory diagram showing the flow of the oil in a reservoir chamber.

As shown in FIG. 3 and FIG. 11 that will be described later, the baffle member 80 that has the above-described configuration is disposed in such a manner as to surround the discharge point of the oil between the solenoid valve 50 and the reservoir chamber R. Specifically, the notch portion 812U surrounds an outer periphery of the skirt member 612 of the flow path restriction unit 60, and the end portion 812Ua is held in such a manner as to be hung by the skirt member 612. Herein, in the embodiment, the skirt member 612 is held by the solenoid cylinder 50S of the solenoid valve 50. Therefore, the baffle member 80 is mounted in such a manner as to surround an outer periphery of the outer tubular body 12 in a state where the baffle member is held by the solenoid valve 50 via the skirt member 612.

In the embodiment, when the baffle member 80 is held by the skirt member 612, the baffle member 80 is inserted in the axial direction of the outer tubular body 12, and assembly is performed in such a manner that the notch portion 812U which has an opening in one direction in the axial direction is fitted around the skirt member 612. In this case, for example, it is possible to install the baffle member 80 after assembling all of the solenoid valve 50 and the like (refer to FIG. 3) with the outer tubular body 12 and the damper case 13 in the hydraulic shock absorbing apparatus 1. In this manner, in the embodiment, it is possible to improve assemblability of the components.

The baffle member 80 that has the above-described configuration functions in such a manner as to decrease the air bubbles in the oil discharged from the solenoid valve 50 via the skirt member 612. In other words, the end portion 812Ua of the baffle member 80 restricts the flow of the oil while the flow of the oil is guided by the entire notch portion 812U. In this manner, in the end portion 812Ua side of the notch portion 812U, the movement of the oil is restricted and the oil is retained in the end portion 812Ua. Furthermore, the oil flows in one direction while being regulated by the notch portion 812U. Furthermore, even when the oil moves over the end portion 812Ua, the movement is restricted by the step portion 811L, and the oil is still retained by the step portion 811L.

The baffle member 80 that is disposed in this manner causes the oil containing the air bubbles to take a predetermined length of time to pass through the liquid surface or the like, and thus the rippling on the liquid surface caused by the oil discharged from the solenoid valve 50 is suppressed. As a result, it is possible to prevent the generation of the air bubbles in the oil, a delay in the generation of the damping force is suppressed in the hydraulic shock absorbing apparatus 1, and it is possible to generate the predetermined amount of the damping force.

As described above, in the embodiment, the skirt member 612 is disposed at the discharge point of the oil in the solenoid cylinder 50S, and the notch portion 812U of the baffle member 80 is placed in such a manner as to surround the skirt member 612. Therefore, the baffle member 80 is disposed close to the skirt member 612, and the oil is likely to be retained by the notch portion 812U. Also, the baffle member 80 is held by the skirt member 612, and the positional relationship is specified with respect to the solenoid cylinder 50S via the skirt member 62. Therefore, the positioning accuracy of the baffle member 80 is raised, and it is possible to reliably reduce the air bubbles by the baffle member 80.

Furthermore, the skirt member 612 and the baffle member 80 cause the oil flowing out from the notch portion 612U side of the skirt member 612 to be guided by the guide unit 812 of the baffle member 80, and thus the oil is moved to a side opposite to the oil surface, and time can be gained until the oil flows out onto the oil surface. Therefore, a synergy effect is achieved by further reducing the air bubbles.

Also, the oil flowing into the reservoir chamber R is moved in the limited space in the notch portion 812U by the baffle member 80. Furthermore, the movement of the oil that moves in a restricted manner in the notch portion 812U is further suppressed as the oil collides with the end portion 812Ua. Also, the movement of the oil that is moved further toward the cylindrical portion 811 side over the notch portion 812U is restricted even in the step portion 811L. As described above, in the reservoir chamber R, the baffle member 80 restricts the movement of the oil, and thus the rippling on the oil surface in particular is suppressed, and the generation of the air bubbles caused by the rippling is also suppressed.

The baffle member 80 according to the embodiment is configured in such a manner as to operate the notch portion 812U, the step portion 811L and the like with respect to the flow of the oil mainly in "the outer circumferential portion" of the baffle member 80 to reduce the air bubbles of the oil. However, the invention is not limited thereto. In other words, the notch portion 812U and the step portion 811L may be operated with respect to the flow of the oil between the outer circumference of the outer tubular body 12 and "the inner circumference" of the baffle member 80 to prevent the generation of the air bubbles in the oil.

Figure 9A:
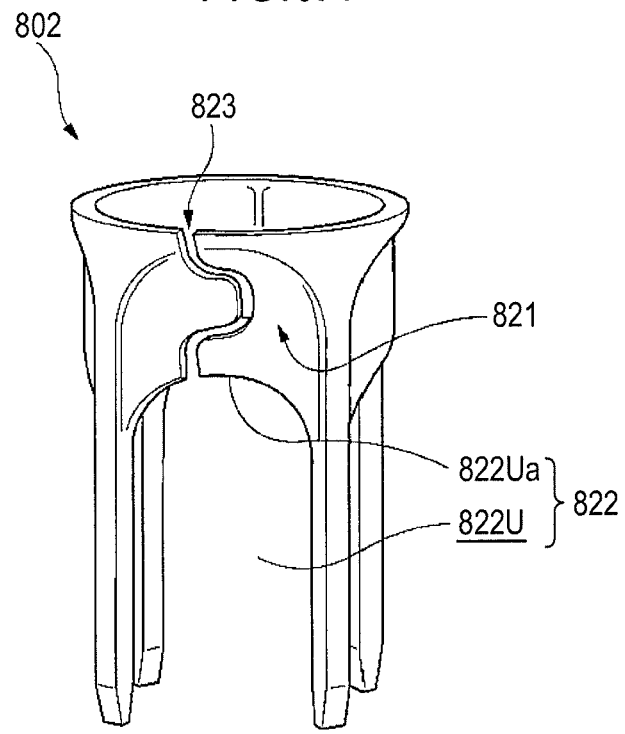
FIGS. 9A and 9B are explanatory diagrams showing baffle members according to the modification example.
Figure 9B:
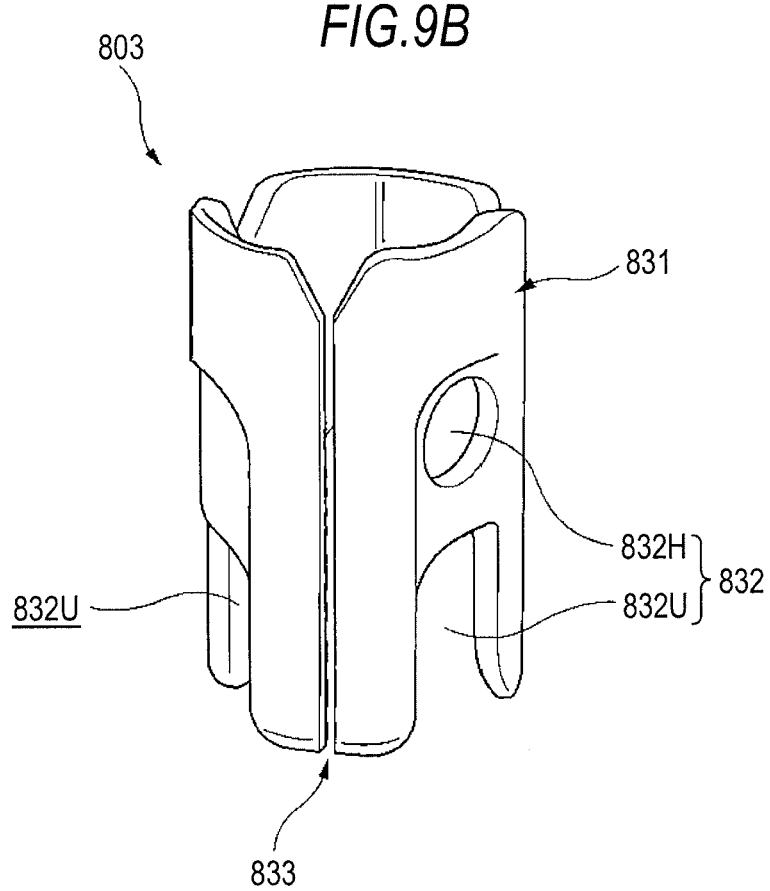

FIGS. 9A and 9B are explanatory diagrams showing baffle members according to the modification example.

FIG. 9A shows a second baffle member 802 according to the modification example, and FIG. 9B shows a third baffle member 803 according to the modification example.

As shown in FIG. 9A, the second baffle member 802 (inter-cylinder regulation unit) according to the modification example is an approximately toric member, and is disposed in such a manner as to be coupled with the outer circumferential surface of the outer tubular body 12. The second baffle member 802 includes a cylindrical portion 821, a guide unit 822, and a groove portion 823.

The cylindrical portion 821 has an approximately cylindrical shape. The cylindrical portion 821 is formed in such a manner as to have an inner diameter that is approximately equal to the outer circumference of the outer tubular body 12. Also, the cylindrical portion 821 is formed in such a manner as to have an outer diameter that is smaller than the inner diameter of the damper case 13.

In the guide unit 822, a concave portion 822U that extends along the cylinder axis direction is formed in a plural number (four in the embodiment) in the circumferential direction. The width of the opening formed by the concave portion 822U is set to be much longer than the outer diameter of the skirt member 612 of the above-described flow path restriction unit 60. Furthermore, the width of an end portion 822Ua of the concave portion 822U gradually decreases toward the center line direction. Also, the end portion 822Ua is formed along the outer shape of the above-described skirt member 612 to have, for example, a curved shape such as an arc shape.

The groove portion 823 is formed in the cylindrical portion 821. The groove portion 823 is bent and formed from one side to the other side in the cylinder axis direction. In this manner, the groove portion 823 may have a hook shape with a bent portion instead of a linear shape.

Since the groove portion 823 is formed in such a manner as to have the bent portion, it is possible to suppress torsional deformation by bringing surfaces directed toward the direction crossing the cylinder axis direction into contact with each other in a case, for example, where the deformation occurs in the cylinder axis direction of the second baffle member 802.

Subsequently, the third baffle member 803 according to the modification example will be described.

As shown in FIG. 9B, the third baffle member 803 (inter-cylinder regulation unit) according to the modification example is an approximately tonic member, and is mounted in such a manner as to surround the outer circumferential surface of the outer tubular body 12. The third baffle member 803 includes a cylindrical portion 831, a guide unit 832, and a groove portion 833.

The third baffle member 803 has the same basic configuration as the above-described baffle member 80. The cylindrical portion 831 and the groove portion 833 have the same basic configuration as the cylindrical portion 811 and the groove portion 813 of the baffle member 80, respectively. Therefore, the detailed description will be omitted herein.

The third baffle member 803 is different from the baffle member 80 when it comes to the shape of the guide unit 832. In other words, the guide unit 832 has an opening portion 832H whose inner diameter is approximately equal to the outer diameter of the skirt member 612, and a notch portion 832U. The third baffle member 803 is disposed in such a manner that the skirt member 612 passes through the opening portion 832H, is held by the skirt member 612, and is mounted in such a manner that the cylindrical portion 831 surrounds the outer periphery of the outer tubular body 12.

Also, the notch portion 832U is formed in such a manner as to extend along the cylinder axis direction, and is formed in a plural number (three in the embodiment) in the circumferential direction. The width of the opening formed by the notch portion 832U is set to be approximately equal to the inner diameter of the opening portion 832H.

In the second baffle member 802 and the third baffle member 803 according to the modification example that have the above-described configuration, it is possible to prevent the generation of the air bubbles by the oil (in the oil) discharged from the solenoid valve 50 via the skirt member 612.

In other words, the end portion 812Ua of the second baffle member 802 and the opening portion 832H of the third baffle member 803 restrict the flow of the oil while the notch portion 812U of the second baffle member 802 and the notch portion 832U of the third baffle member 803 guide the flow of the oil. The second baffle member 802 and the third baffle member 803 that are disposed in this manner cause a predetermined length of time to be taken until the oil containing the air bubbles reaches the liquid surface or the like, and thus the rippling on the liquid surface caused by the oil discharged from the solenoid valve 50 is suppressed. As a result, it is possible to prevent the generation of the air bubbles in the oil.

Also, the skirt member 612 is disposed at the discharge point of the oil in the solenoid cylinder 50S, and the notch portion 812U of the second baffle member 802 and the opening portion 832H of the third baffle member 803 are placed in such a manner as to surround the skirt member 612. Therefore, the second baffle member 802 and the third baffle member 803 are disposed close to the skirt member 612, and the oil is likely to be retained by the notch portion 812U and the notch portion 832U. Also, the second baffle member 802 and the third baffle member 803 are held by the skirt member 612, and the positional relationship is specified with respect to the solenoid cylinder 50S via the skirt member 62. Therefore, the positioning accuracy of the second baffle member 802 and the third baffle member 803 is raised, and it is possible to reliably reduce the air bubbles by the baffle member 80.

Operation of Hydraulic Shock Absorbing Apparatus 1

Hereinafter, the operation of the hydraulic shock absorbing apparatus 1 that has the above-described configuration will be described.

First, the operation of the hydraulic shock absorbing apparatus 1 during the compression stroke will be described.

As shown in FIG. 2, when the piston 30 moves toward the one end portion side in the axial direction (lower side in FIG. 2) during the compression stroke, the oil in the first oil chamber Y1 is pressed by the movement of the piston 30, and pressure in the first oil chamber Y1 increases.

In the bottom valve 40, the valve 42 is disposed on the other side of the valve body 41, and pressure in the space 412H is relatively lower than the pressure in the first oil chamber Y1, and thus the oil passage 46 remains closed by the valve 42.

In the piston 30, the pressure in the first oil chamber Y1 is relatively higher than pressure in the second oil chamber Y2. At this time, the valve 32 that closes the oil passage 31H is opened by pressure acting on the oil passage 31H so that the oil flows from the first oil chamber Y1 toward the second oil chamber Y2.

Furthermore, the oil corresponding to the volume of the piston rod 20 flows out from the cylinder opening 11H, flows through the communication passage L, and is supplied to the solenoid valve 50.

Figure 10A:
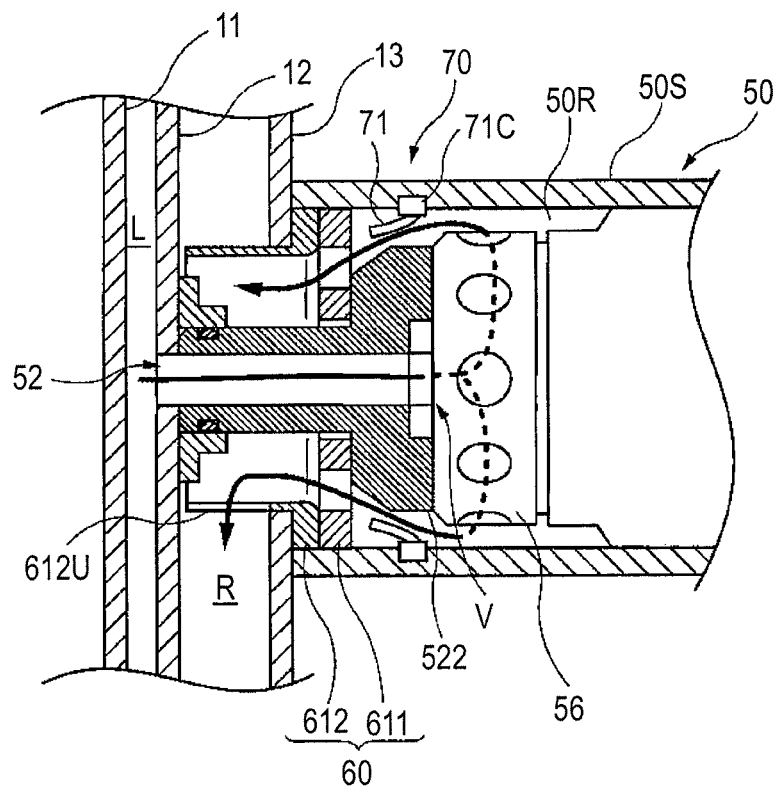
FIGS. 10A and 10B are explanatory diagrams showing the flow of oil in the solenoid valve.
Figure 10B:
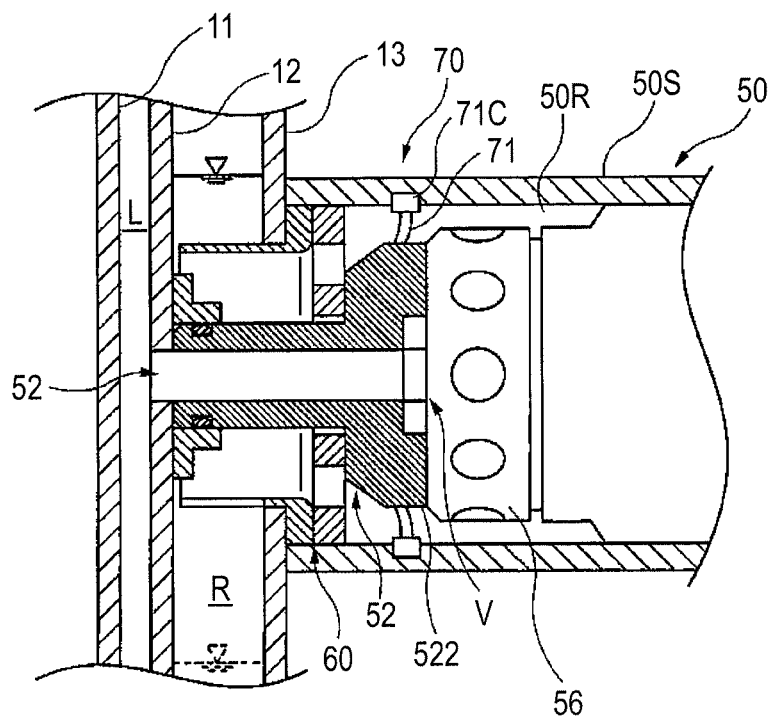

FIGS. 10A and 10B are explanatory diagrams showing the flow of the oil in the solenoid valve 50.

FIG. 11 is an explanatory diagram showing the flow of the oil in the reservoir chamber R.

As shown in FIG. 10A, the solenoid valve 50 receives the supply of the oil via the suction port 52 that is connected to the communication passage L. The flow of the oil flowing through the suction port 52 is throttled by the throttle unit V that is formed between the valve element 54 and the valve stopper 53. At this time, the damping force during the compression stroke in the solenoid valve 50 is obtained.

The oil moving through the throttle unit V is discharged from the discharge ring 56 toward the cylinder inner chamber 50R. Furthermore, the oil push-opens the check valve 71 of the check valve mechanism 70, and flows out toward the reservoir chamber R through the rectification member 611 and the skirt member 612 of the flow path restriction unit 60.

Herein, the oil is pushed into the skirt member 612, and thus the flow of the oil is regulated toward the one side of the cylinder inner chamber 50R. Therefore, it is possible to suppress the rippling on the oil surface and to prevent the generation of the air bubbles.

Furthermore, as shown in FIG. 11, the oil moving out of the notch portion 612U of the skirt member 612 flows in the reservoir chamber R while being restricted by the baffle member 80. In other words, the notch portion 812U of the guide unit 812 that is disposed in such a manner as to surround the periphery of the skirt member 612 first causes the oil to be retained in the end portion 812Ua with the movement thereof being restricted on the end portion 812Ua side of the notch portion 812U. Furthermore, the oil flows in one direction while being regulated by the notch portion 812U. In this manner, the baffle member 80 causes a predetermined length of time to be taken until the oil reaches the liquid surface or the like, and thus the rippling on the liquid surface caused by the oil discharged from the solenoid valve 50 is suppressed. As a result, it is possible to prevent the generation of the air bubbles in the oil.

Next, the operation during the expansion stroke of the hydraulic shock absorbing apparatus 1 will be described.

As shown in FIG. 2, when the piston 30 moves toward the other end portion side (upper side in FIG. 2) in the axial direction, the first oil chamber Y1 has a negative pressure. Therefore, the oil in the reservoir chamber R moves through the oil passage 46 of the bottom valve 40 via the concave portion 44 and the space 412H, opens the valve 42 that closes the oil passage 46, and flows into the first oil chamber Y1 The flow of the oil from the reservoir chamber R toward the first oil chamber Y1 is throttled by the valve 42 and the oil passage 46 of the bottom valve 40, and the damping force during the expansion stroke of the hydraulic shock absorbing apparatus 1 is obtained.

The pressure in the second oil chamber Y2 that is raised by the movement of the piston 30 toward the other end portion side in the axial direction flows out from the cylinder opening 11H, flows through the communication passage L, and is supplied to the solenoid valve 50. The flow of the oil in the solenoid valve 50 after this moment is as described referring to FIGS. 10A, 10B, and 11 so that the damping force during the expansion stroke in the solenoid valve 50 is obtained. Furthermore, the air bubbles in the oil discharged from the solenoid valve 50 are suppressed.

As shown in FIG. 10B, during the expansion stroke, the liquid surface is lowered as the oil flows from the reservoir chamber R toward the first oil chamber Y1 as described above. The lowering of the liquid surface is caused by not only the expansion stroke but also another factor such as the vertical movement of the hydraulic shock absorbing apparatus 1. There is a possibility that the lowering of the liquid surface in the reservoir chamber R could cause the air bubbles present in a large amount near the liquid surface and the air in the reservoir chamber R to flow into the throttle unit V of the solenoid valve 50.

In contrast, in the hydraulic shock absorbing apparatus 1 according to the embodiment, the fluid such as the air is suppressed from entering the back side of the cylinder inner chamber 50R since the check valve mechanism 70 is disposed. For example, it is possible to prevent the air from being mixed with the oil discharged from the throttle unit V and prevent the oil containing the large air bubbles from being supplied toward the bottom valve 40 side.

As described above, in the hydraulic shock absorbing apparatus 1 to which the embodiment is applied, the flow path restriction unit 60, the check valve mechanism 70, and the baffle member 80 are arranged at the discharge point from the solenoid valve 50, and thus the oil containing the large air bubbles is prevented from being diffused from the vicinity of the discharge point of the solenoid valve 50, and the air bubbles of the oil are suppressed.

Also, all of the rectification member 611 and the skirt member 612 of the flow path restriction unit 60 and the check valve mechanism 70 are held by the solenoid cylinder 50S of the solenoid valve 50. Furthermore, the baffle member 80 is also held by the solenoid cylinder 50S via the skirt member 612. In this manner, all of the flow path restriction unit 60, the check valve mechanism 70, and the baffle member 80 are held by the solenoid cylinder 50S. Therefore, in the embodiment, the positional relationship of these members with respect to the discharge point of the solenoid valve 50 is directly determined, and thus the reliability of the positioning is improved. Furthermore, it is possible to improve the assemblability.

In the embodiment, since the generation of the air bubbles in the oil is prevented, all of the flow path restriction unit 60, the check valve mechanism 70, and the baffle member 80 do not necessarily have to be disposed at the same time. For example, only the flow path restriction unit 60 or the like may be disposed at the discharge point of the solenoid valve 50, and only some of these members such as the flow path restriction unit 60 and the baffle member 80 may be used in combination.

In the embodiment, a so-called triple tube structure configured of the cylinder 11, the outer tubular body 12, and the damper case 13, each having a cylindrical shape, forms the oil chambers (the first oil chamber Y1 and the second oil chamber Y2), the reservoir chamber R, and the communication passage L. However, each component does not necessarily have to be formed by the triple tube structure. For example, an additional path of the oil corresponding to the communication passage L according to the embodiment may be disposed by using a so-called double tube structure configured of the cylinder 11 and the damper case 13. In this case, a tubular pipe through which the oil flows is additionally disposed in the cylinder 11, and the pipe is used to communicate the oil chamber in the cylinder 11 with the suction port 52 of the solenoid valve 50. Even in this case, it is possible to reduce the air bubbles by providing a suppression unit held by the solenoid valve 50 at the discharge point of the oil between the solenoid valve 50 and reservoir chamber R.

For example, in the solenoid valve, the suppression unit may be disposed at a position different in the axial direction of the cylinder from an outlet where the oil damped by the solenoid valve flows out with respect to an inlet where the oil flows into the solenoid valve. Even in this case, the above-described flow path restriction unit 60, the check valve mechanism 70, and the baffle member 80 may be disposed in such a manner as to match the discharge point of the oil from the solenoid cylinder.

What is claimed is:

1. A pressure shock absorbing apparatus comprising:
a first cylinder that accommodates a liquid;
a second cylinder that is placed outside the first cylinder to form a liquid storage unit with the first cylinder in which the liquid accumulates between the first cylinder and the second cylinder;
a partitioning member that is disposed in such a manner as to be movable in an axial direction inside the first cylinder to partition a space inside the first cylinder into a first liquid chamber and a second liquid chamber that accommodate the liquid;
a throttle mechanism that is disposed in a side portion of the second cylinder, and includes a throttle unit that throttles a flow path cross section of the liquid to discharge the liquid taken in from the first cylinder toward the liquid storage unit while passing the liquid through the throttle unit; and
a suppression unit that is held by the throttle mechanism at a liquid discharge point includes a restriction unit that restricts the flow of a liquid discharged from the throttle mechanism in such a manner as to decrease the flow path cross section of said liquid thereby suppressing air bubbles in the liquid in the liquid storage unit, wherein the restriction unit is an annular member whose side surface extends toward the first cylinder with at least a portion thereof being disposed between the first cylinder and the second cylinder.

2. The pressure shock absorbing apparatus according to claim 1,
wherein the restriction unit is disposed in such a manner as to surround a periphery of the discharge point in the liquid storage unit, and has an outflow portion which causes the liquid to flow out from a part of the restriction unit in a circumferential direction of the annular member.

3. A pressure shock absorbing apparatus comprising:
a first cylinder that accommodates a liquid and extends in an axial direction;
a second cylinder that is placed outside the first cylinder to form a liquid storage unit with the first cylinder in which the liquid accumulates between the first cylinder and the second cylinder;
a partitioning member that is disposed in such a manner as to be movable in an axial direction inside the first cylinder to partition a space inside the first cylinder into a first liquid chamber and a second liquid chamber that accommodate the liquid;
a throttle mechanism that is disposed in a side portion of the second cylinder, and includes a throttle unit that throttles a flow path cross section of the liquid to discharge the liquid taken in from the first cylinder toward the liquid storage unit while passing the liquid through the throttle unit; and
an inter-cylinder regulation unit that extends in the axial direction and is placed between circumferential surfaces of the first cylinder and the second cylinder, and is held by the throttle mechanism and is disposed in the liquid storage unit to regulate the flow of the discharged liquid into one direction,
wherein the inter-cylinder regulation unit includes an insertion member that is an annular member which is disposed at an outer circumferential portion of the first cylinder, and
wherein the insertion member is formed with a notch portion that extends from one end portion side in an axial direction of the second cylinder toward the other end portion side.

4. The pressure shock absorbing apparatus according to claim 3,
wherein the insertion member has a protruding portion protruding from an inner circumferential portion toward the first cylinder side.

5. The pressure shock absorbing apparatus according to claim 3,
wherein the insertion member has a circumferential direction surface which is disposed in an end portion on an opposite side to the notch portion in the axial direction and faces the circumferential direction.

6. A pressure shock absorbing apparatus comprising:
a first cylinder that accommodates a liquid and extends in an axial direction;
a second cylinder that is placed outside the first cylinder to form a liquid storage unit with the first cylinder in which the liquid accumulates between the first cylinder and the second cylinder;
a partitioning member that is disposed in such a manner as to be movable in an axial direction inside the first cylinder to partition a space inside the first cylinder into a first liquid chamber and a second liquid chamber that accommodate the liquid;
a throttle mechanism that is disposed in a side portion of the second cylinder, and includes a throttle unit that throttles a flow path cross section of the liquid to discharge the liquid taken in from the first cylinder toward the liquid storage unit while passing the liquid through the throttle unit; and
an inter-cylinder regulation unit that extends in the axial direction and is placed between circumferential surfaces of the first cylinder and the second cylinder, and is held by the throttle mechanism and is disposed in the liquid storage unit to regulate the flow of the discharged liquid into one direction,
wherein the inter-cylinder regulation unit includes an insertion member that is an annular member which is disposed at an outer circumferential portion of the first cylinder,
wherein the insertion member is formed with a notch portion that extends from one end portion side in an axial direction of the second cylinder toward the other end portion side, and
wherein a concave portion is formed at a position continuing from a tip end of the other end portion side in the notch portion and is disposed on at least one of an outer circumferential surface and an inner circumferential surface of the insertion member.

7. A pressure shock absorbing apparatus comprising:
a first cylinder that accommodates a liquid and extends in an axial direction;
a second cylinder that is placed outside the first cylinder to form a liquid storage unit with the first cylinder in which the liquid accumulates between the first cylinder and the second cylinder;
a partitioning member that is disposed in such a manner as to be movable in an axial direction inside the first cylinder to partition a space inside the first cylinder into a first liquid chamber and a second liquid chamber that accommodate the liquid;
a throttle mechanism that is disposed in a side portion of the second cylinder, and includes a throttle unit that throttles a flow path cross section of the liquid to discharge the liquid taken in from the first cylinder toward the liquid storage unit while passing the liquid through the throttle unit; and
an inter-cylinder regulation unit that extends in the axial direction and is placed between circumferential surfaces of the first cylinder and the second cylinder, and is held by the throttle mechanism and is disposed in the liquid storage unit to regulate the flow of the discharged liquid into one direction,
wherein the inter-cylinder regulation unit includes an insertion member that is an annular member which is disposed at an outer circumferential portion of the first cylinder,
wherein the insertion member is formed with a notch portion that extends from one end portion side in an axial direction of the second cylinder toward the other end portion side, and
wherein the insertion member has a groove portion that decouples the insertion member in a circumferential direction of the second cylinder.

8. A pressure shock absorbing apparatus comprising:
a first cylinder that accommodates a liquid;
a second cylinder that is placed outside the first cylinder to form a liquid storage unit with the first cylinder in which the liquid accumulates between the first cylinder and the second cylinder;
a partitioning member that is disposed in such a manner as to be movable inside the first cylinder to partition a space inside the first cylinder into a first liquid chamber and a second liquid chamber that accommodate the liquid;

a throttle mechanism that is disposed in a side portion of the second cylinder, and includes a solenoid mechanism unit and a throttle unit that throttles a flow path cross section of the liquid using the solenoid mechanism unit to discharge the liquid taken in from the first cylinder toward the liquid storage unit while passing the liquid through the throttle unit; and an allowance restriction unit that is held by the throttle mechanism and is disposed between the solenoid mechanism unit and the liquid storage unit so as to allow the flow of a fluid adjusted by the solenoid mechanism unit from the throttle unit toward the liquid storage unit and to restrict the flow of the fluid from the liquid storage unit toward the throttle unit, wherein the throttle mechanism has a solenoid cylinder accommodating the throttle unit and the solenoid mechanism unit, and the allowance restriction unit contacts an inner circumferential wall of the solenoid cylinder.

9. The pressure shock absorbing apparatus according to claim 8, wherein the allowance restriction unit is disposed between the throttle unit and the liquid storage unit, and allows the flow by being elastically deformed by the flow of the fluid from the throttle unit toward the liquid storage unit and restricts the flow by resisting the flow of the fluid from the liquid storage unit toward the throttle unit.

* * * * *